United States Patent
Patil et al.

(10) Patent No.: US 11,412,466 B2
(45) Date of Patent: Aug. 9, 2022

(54) SYNCHRONIZATION IN ACCESS POINT (AP) COORDINATION

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 16/598,605

(22) Filed: Oct. 10, 2019

(65) Prior Publication Data

US 2020/0137702 A1 Apr. 30, 2020

Related U.S. Application Data

(60) Provisional application No. 62/751,473, filed on Oct. 26, 2018.

(51) Int. Cl.
- *H04W 56/00* (2009.01)
- *H04B 7/10* (2017.01)
- *H04W 92/20* (2009.01)
- *H04W 88/08* (2009.01)

(52) U.S. Cl.
CPC ........... *H04W 56/001* (2013.01); *H04B 7/10* (2013.01); *H04W 88/08* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2014/0321566 A1 | 10/2014 | Wu et al. | |
| 2014/0362840 A1* | 12/2014 | Wong | H04W 72/12 370/338 |
| 2015/0063228 A1* | 3/2015 | Aldana | H04W 64/00 370/329 |
| 2016/0345277 A1* | 11/2016 | Segev | H04L 1/16 |
| 2017/0048671 A1* | 2/2017 | Marri Sridhar | H04W 4/023 |
| 2018/0049130 A1* | 2/2018 | Huang | H04W 56/001 |
| 2018/0234918 A1* | 8/2018 | Asterjadhi | H04W 52/0229 |
| 2019/0246351 A1* | 8/2019 | Yang | H04W 52/0216 |
| 2021/0136803 A1* | 5/2021 | Han | H04W 56/001 |

FOREIGN PATENT DOCUMENTS

EP 3026974 A1 6/2016

OTHER PUBLICATIONS

International Search Report and Written Opinion—PCT/US2019/055923—ISA/EPO—dated Jan. 17, 2020.

* cited by examiner

*Primary Examiner* — Saba Tsegaye
(74) *Attorney, Agent, or Firm* — Qualcomm Incorporated

(57) ABSTRACT

Certain aspects of the present disclosure provide an apparatus for wireless communication. The apparatus generally includes a processing system configured to generate a message comprising coordination information, wherein the apparatus is associated with a first AP, the message to be used for coordinated communications by the first AP and a second AP, wherein the first AP and the second AP are associated with different basic service sets (BSSs), and an interface configured to output the message for transmission during a networking coordination window of a networking cluster.

30 Claims, 19 Drawing Sheets

SYNCHRONIZATION IN ACCESS POINT (AP) COORDINATION

CROSS-REFERENCE TO RELATED APPLICATION

This application claims benefit of and priority to U.S. Provisional Patent Application Ser. No. 62/751,473, filed Oct. 26, 2018, herein incorporated by reference in its entirety as if fully set forth below and for all applicable purposes.

FIELD

Certain aspects of the present disclosure generally relate to wireless communications and, more particularly, to time synchronization.

BACKGROUND

Beamforming operations may be used to direct the transmission of signals in a desired direction towards a receiver. For example, multiple antennas may be coordinated to form a coherent beam traveling in the desired direction. An electrical field may be rotated to change this direction. The resulting transmission is polarized based on the electrical field. A receiver may also include antennas which can match or adapt to changing transmission polarity.

SUMMARY

Certain aspects of the present disclosure provide an apparatus for wireless communication. The apparatus generally includes a processing system configured to generate a message comprising coordination information, wherein the apparatus is associated with a first access point (AP), the message to be used for coordinated communications by the first AP and a second AP, wherein the first AP and the second AP are associated with different basic service sets (BSSs), and an interface configured to output the message for transmission during a networking coordination window of a networking cluster.

Certain aspects of the present disclosure provide an apparatus for wireless communication. The apparatus generally includes a processing system configured to generate a first message for polling one or more wireless nodes to gather synchronization information from a first AP, the apparatus being associated with a second AP, the first AP and the second AP being associated with different BSSs, a first interface configured to output the first message for transmission to the one or more stations, and a second interface configured to obtain a second message from the one or more wireless nodes comprising the synchronization information.

Certain aspects of the present disclosure provide an apparatus for wireless communication. The apparatus generally includes a processing system configured to generate a trigger frame requesting, from one or more first APs, a list of one or more wireless nodes for which the one or more APs have buffered DL traffic, wherein the apparatus is associated with a second AP, the one or more first APs and the second AP being associated with different BSSs, and a first interface configured to output the trigger frame for transmission.

Certain aspects of the present disclosure provide an apparatus for wireless communication. The apparatus generally includes a first interface configured to obtain, from a first AP, a first message, wherein the apparatus is associated with a wireless node, the first message assigning the wireless node to participate in a networking cluster for synchronizing clocks of the first AP and a second AP, the first AP and the second AP being associated with different BSSs, and obtain, from the first AP, a second message during a networking coordination window of the networking cluster comprising coordination information to be used for coordinated communications by the first AP and the second AP, a processing system configured to generate a third message comprising the coordination information, and a second interface configured to output the third message for transmission.

Certain aspects of the present disclosure provide an apparatus for wireless communication. The apparatus generally includes a first interface configured to obtain, from a first AP, a first message, wherein the apparatus is associated with a wireless node, the first message polling the wireless node to gather synchronization information from a second AP, the first AP and the second AP being associated with different BSSs, wherein the first interface is further configured to obtain, from the second AP, a second message comprising the synchronization information in response to obtaining the first message, a processing system configured to generate a third message comprising the synchronization information, and a second interface configured to output the third message for transmission to the first AP.

Certain aspects of the present disclosure provide an apparatus for wireless communication. The apparatus generally includes a first interface configured to obtain, from a first AP, a trigger frame requesting a list of one or more stations for which the apparatus has buffered DL traffic, wherein the apparatus is associated with a second AP, the first AP and the second AP being associated with different BSSs, a processing system configured to generate a message comprising the list of the one or more stations, and a second interface configured to output the message for transmission to the first AP.

Certain aspects of the present disclosure provide a method for wireless communication by an apparatus. The method generally includes generating a message comprising coordination information, wherein the apparatus is associated with a first AP, the message to be used for coordinated communications by the first AP and a second AP, wherein the first AP and the second AP are associated with different BSSs, and outputting the message for transmission during a networking coordination window of a networking cluster.

Certain aspects of the present disclosure provide a method for wireless communication by an apparatus. The method generally includes generating a first message for polling one or more wireless nodes to gather synchronization information from a first AP, the apparatus being associated with a second AP, the first AP and the second AP being associated with different BSSs, outputting the first message for transmission to the one or more wireless nodes, and obtaining a second message from the one or more wireless nodes comprising the synchronization information.

Certain aspects of the present disclosure provide a method for wireless communication by an apparatus. The method generally includes generating a trigger frame requesting, from one or more first APs, a list of one or more stations for which the one or more APs have buffered DL traffic, wherein the apparatus is associated with a second AP, the one or more first APs and the second AP being associated with different BSSs, and outputting the trigger frame for transmission.

Certain aspects of the present disclosure provide a method for wireless communication by an apparatus. The method generally includes obtaining, from a first AP, a first message, wherein the apparatus is associated with a wireless node, the first message assigning the station to participate in a networking cluster for synchronizing clocks of the first AP and a second AP, the first AP and the second AP being associated with different BSSs, obtaining, from the first AP, a second message during a networking coordination window of the networking cluster comprising coordination information to be used for coordinated communications by the first AP and the second AP, generating a third message comprising the coordination information, and outputting the third message for transmission.

Certain aspects of the present disclosure provide a method for wireless communication by an apparatus. The method generally includes obtaining, from a first AP, a first message, wherein the apparatus is associated with a wireless node, the first message polling the wireless node to gather synchronization information from a second AP, the first AP and the second AP being associated with different BSSs, obtaining, from the second AP, a second message comprising the synchronization information in response to obtaining the first message, generating a third message comprising the synchronization information, and outputting the third message for transmission to the first AP.

Certain aspects of the present disclosure provide a method for wireless communication by an apparatus. The method generally includes obtaining, from a first AP, a trigger frame requesting a list of one or more stations for which the apparatus has buffered DL traffic, wherein the apparatus is associated with a second AP, the first AP and the second AP being associated with different BSSs, generating a message comprising the list of the one or more stations, and outputting the message for transmission to the first AP.

Certain aspects of the present disclosure provide an apparatus for wireless communication. The apparatus generally includes means for generating a message comprising coordination information, wherein the apparatus is associated with a first AP, the message to be used for coordinated communications by the first AP and a second AP, wherein the first AP and the second AP are associated with different BSSs, and means for outputting the message for transmission during a networking coordination window of a networking cluster.

Certain aspects of the present disclosure provide an apparatus for wireless communication. The apparatus generally includes means for generating a first message for polling one or more wireless nodes to gather synchronization information from a first AP, the apparatus being associated with a second AP, the first AP and the second AP being associated with different BSSs, means for outputting the first message for transmission to the one or more wireless nodes, and means for obtaining a second message from the one or more wireless nodes comprising the synchronization information.

Certain aspects of the present disclosure provide an apparatus for wireless communication. The apparatus generally includes means for generating a trigger frame requesting, from one or more first APs, a list of one or more stations for which the one or more APs have buffered DL) traffic, wherein the apparatus is associated with a second AP, the one or more first APs and the second AP being associated with different BSSs, and means for outputting the trigger frame for transmission.

Certain aspects of the present disclosure provide an apparatus for wireless communication. The apparatus generally includes means for obtaining, from a first access point (AP), a first message, wherein the apparatus is associated with a wireless node, the first message assigning the station to participate in a networking cluster for synchronizing clocks of the first AP and a second AP, the first AP and the second AP being associated with different BSSs, means for obtaining, from the first AP, a second message during a networking coordination window of the networking cluster comprising coordination information to be used for coordinated communications by the first AP and the second AP, means for generating a third message comprising the coordination information, and means for outputting the third message for transmission.

Certain aspects of the present disclosure provide an apparatus for wireless communication. The apparatus generally includes means for obtaining, from a first AP, a first message, wherein the apparatus is associated with a wireless node, the first message polling the station to gather synchronization information from a second AP, the first AP and the second AP being associated with different BSSs, means for obtaining, from the second AP, a second message comprising the synchronization information in response to obtaining the first message, means for generating a third message comprising the synchronization information, and means for outputting the third message for transmission to the first AP.

Certain aspects of the present disclosure provide an apparatus for wireless communication. The apparatus generally includes means for obtaining, from a first AP, a trigger frame requesting a list of one or more stations for which the apparatus has buffered DL traffic, wherein the apparatus is associated with a second AP, the first AP and the second AP being associated with different BSSs, means for generating a message comprising the list of the one or more stations, and means for outputting the message for transmission to the first AP.

Certain aspects of the present disclosure provide a first AP. The first AP generally includes at least one antenna, a processing system configured to generate a message comprising coordination information, the message to be used for coordinated communications by the first AP and a second AP, wherein the first AP and the second AP are associated with different BSSs, and a first interface configured to output the message for transmission via the at least one antenna during a networking coordination window of a networking cluster.

Certain aspects of the present disclosure provide a first AP. The first AP generally includes a processing system configured to generate a first message for polling one or more wireless nodes to gather synchronization information from a second, the first AP and the second AP being associated with different BSSs, a first interface configured to output the first message for transmission to the one or more wireless nodes, and a second interface configured to obtain a second message from the one or more wireless nodes comprising the synchronization information.

Certain aspects of the present disclosure provide a first AP. The first AP generally includes a processing system configured to generate a trigger frame requesting, from one or more second APs, a list of one or more stations for which the one or more second APs have buffered DL traffic, the first AP and the one or more second APs being associated with different basic service sets (BSSs), and a first interface configured to output the trigger frame for transmission.

Certain aspects of the present disclosure provide a station. The station generally includes a first interface configured to obtain, from a first access point (AP), a first message, the first message assigning the station to participate in a networking cluster for synchronizing clocks of the first AP and a second AP, the first AP and the second AP being associated with different BSSs, and obtain, from the first AP, a second message during a first networking coordination window of the networking cluster comprising coordination information to be used for coordinated communications by the first AP and the second AP, a processing system configured to generate a third message comprising the coordination information, and a second interface configured to output the third message for transmission.

Certain aspects of the present disclosure provide a station. The station generally includes a first interface configured to obtain, from a first AP, a first message, the first message polling the station to gather synchronization information from a second AP, the first AP and the second AP being associated with different BSSs, wherein the first interface is further configured to obtain, from the second AP, a second message comprising the synchronization information in response to obtaining the first message, a processing system configured to generate a third message comprising the synchronization information, and a second interface configured to output the third message for transmission to the first AP.

Certain aspects of the present disclosure provide a first AP. The first AP generally includes a first interface configured to obtain, from a second AP, a trigger frame requesting a list of one or more stations for which the first AP has buffered DL traffic, the first AP and the second AP being associated with different BSSs, a processing system configured to generate a message comprising the list of the one or more stations, and a second interface configured to output the message for transmission to the second AP.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
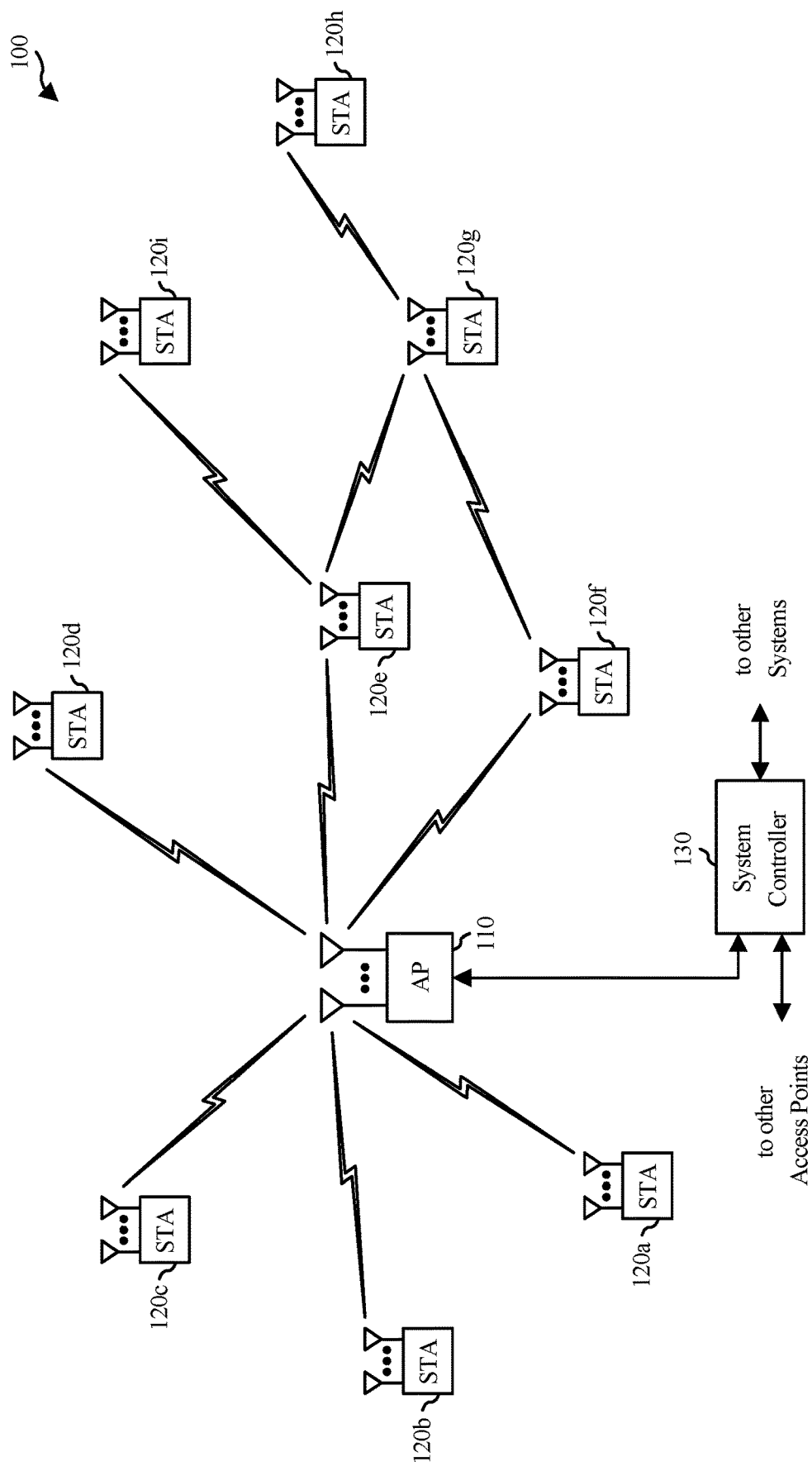
FIG. 1 is a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The techniques described herein may be used for various broadband wireless communication systems, including communication systems that are based on a single carrier transmission. Aspects may be, for example, advantageous to systems employing Ultra-Wide Band (UWB) signals including millimeter-wave signals. However, this disclosure is not intended to be limited to such systems, as other coded signals may benefit from similar advantages.

The techniques may be incorporated into (such as implemented within or performed by) a variety of wired or wireless apparatuses (such as nodes). In some implementations, a node includes a wireless node. Such a wireless node may provide, for example, connectivity to or for a network (such as a wide area network (WAN) such as the Internet or a cellular network) via a wired or wireless communication link. In some implementations, a wireless node may include an access point or a station.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple stations. A TDMA system may allow multiple stations to share the same frequency channel by dividing the transmission signal into different time slots, each time slot being assigned to different stations. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a station, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a system 100 in which aspects of the disclosure may be performed. The system 100 may be, for example, a multiple-access multiple-input multiple-output (MIMO) system 100 with access points and stations. For simplicity, only one access point 110 is shown in FIG. 1. An access point is generally a fixed station that communicates with the stations and may also be referred to as a base station or some other terminology. A STA may be fixed or mobile and may also be referred to as a mobile station, a wireless device, or some other terminology. Access point 110 may communicate with one or more stations 120 at any given moment on the downlink and uplink. The downlink (i.e., forward link) is the communication link from the access point to the stations, and the uplink (i.e., reverse link) is the communication link from the stations to the access point. A station may also communicate peer-to-peer with another station.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

Figure 2:
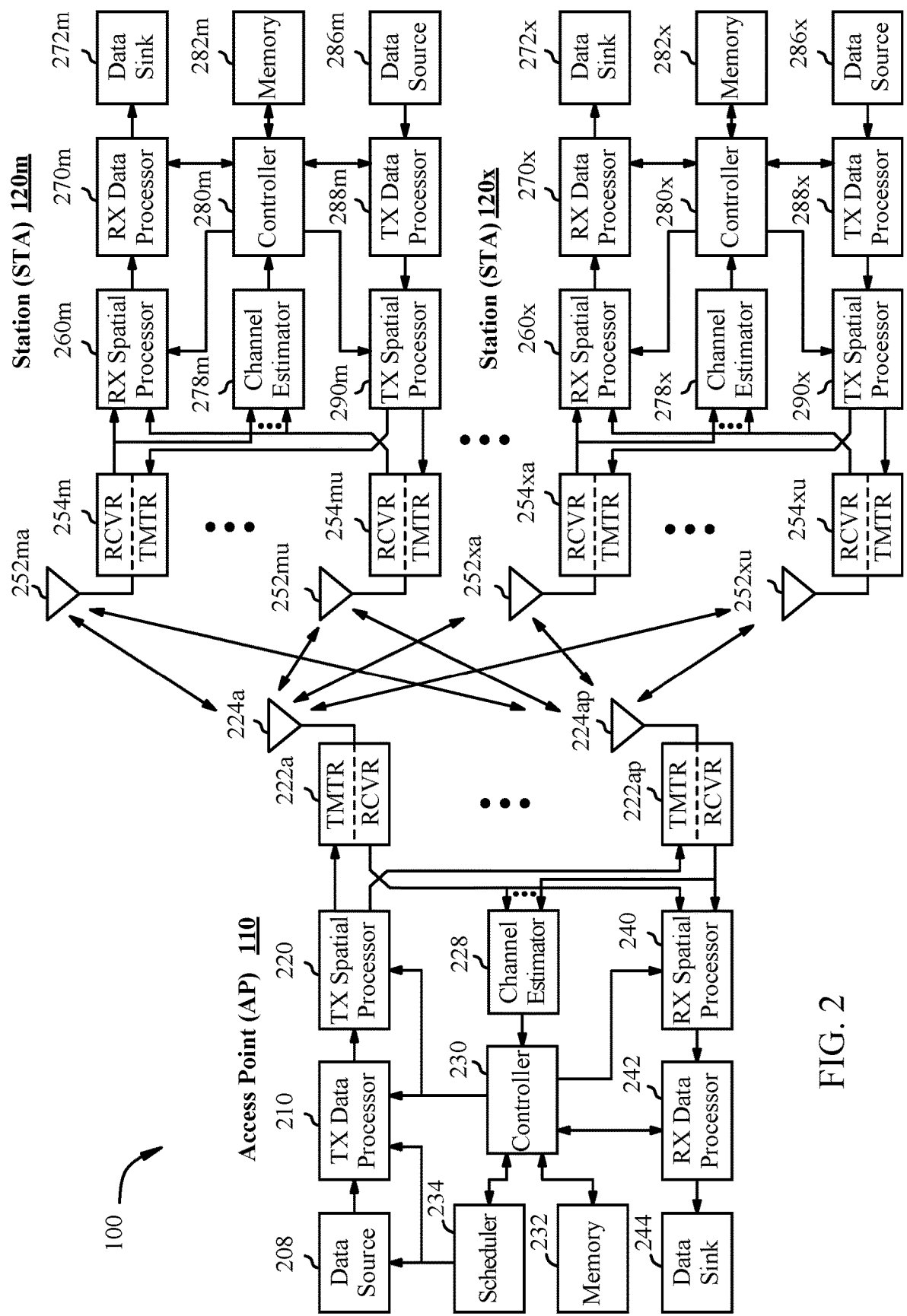
FIG. 2 is a block diagram of an example access point and example stations, in accordance with certain aspects of the present disclosure.

FIG. 2 illustrates example components of the access point 110 and station 120 illustrated in FIG. 1, which may be used to implement aspects of the present disclosure. One or more components of the access point 110 and station 120 may be used to practice aspects of the present disclosure. For example, antenna 224, transmitter/receiver unit 222, processors 210, 220, 240, 242, and/or controller 230 or antenna 252, transmitter/receiver 254, processors 260, 270, 288, and 290, and/or controller 280 may be used to perform the operations described herein and illustrated with reference to FIGS. 6-8 and 6A, 7A, and 8A.

FIG. 2 illustrates a block diagram of access point 110 two stations 120$m$ and 120$x$ in a MIMO system 100. The access point 110 is equipped with $N_t$ antennas 224$a$ through 224$ap$. STA 120$m$ is equipped with $N_{ut,m}$ antennas 252$ma$ through 252$mu$, and STA 120$x$ is equipped with $N_{ut,x}$ antennas 252$xa$ through 252$xu$. The access point 110 is a transmitting entity for the downlink and a receiving entity for the uplink. Each station 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup STA are selected for simultaneous transmission on the uplink, Ndn stations are selected for simultaneous transmission on the downlink, Nup may or may not be equal to Ndn, and Nup and Ndn may be static values or can change for each scheduling interval. The beam-steering or some other spatial processing technique may be used at the access point and station.

On the uplink, at each station 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the STA based on the coding and modulation schemes associated with the rate selected for the STA and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup stations may be scheduled for simultaneous transmission on the uplink. Each of these stations performs spatial processing on its data symbol stream and transmits its set of transmit symbol streams on the uplink to the access point.

At access point 110, $N_{ap}$ antennas 224$a$ through 224$ap$ receive the uplink signals from all Nup stations transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA may be provided to a data sink 244 for storage and/or a controller 230 for further processing. The controller 230 may be coupled with a memory 232.

On the downlink, at access point 110, a TX data processor 210 receives traffic data from a data source 208 for Ndn stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides Ndn downlink data symbol streams for the Ndn stations. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the stations. The decoded data for each STA may be provided to a data sink 272 for storage and/or a controller 280 for further processing.

At each station 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the station.

At each station 120, a channel estimator 278 estimates the downlink channel response and provides downlink channel estimates, which may include channel gain estimates, signal-to-noise ratio (SNR) estimates, noise variance and so on. Similarly, at access point 110, a channel estimator 228 estimates the uplink channel response and provides uplink channel estimates. Controller 280 for each STA typically derives the spatial filter matrix for the STA based on the downlink channel response matrix Hdn,m for that STA. Controller 230 derives the spatial filter matrix for the access point based on the effective uplink channel response matrix Hup,eff. Controller 280 for each STA may send feedback information (e.g., the downlink and/or uplink eigenvectors, eigenvalues, SNR estimates, and so on) to the access point. Controllers 230 and 280 also control the operation of various processing units at access point 110 and station 120, respectively.

Figure 3:
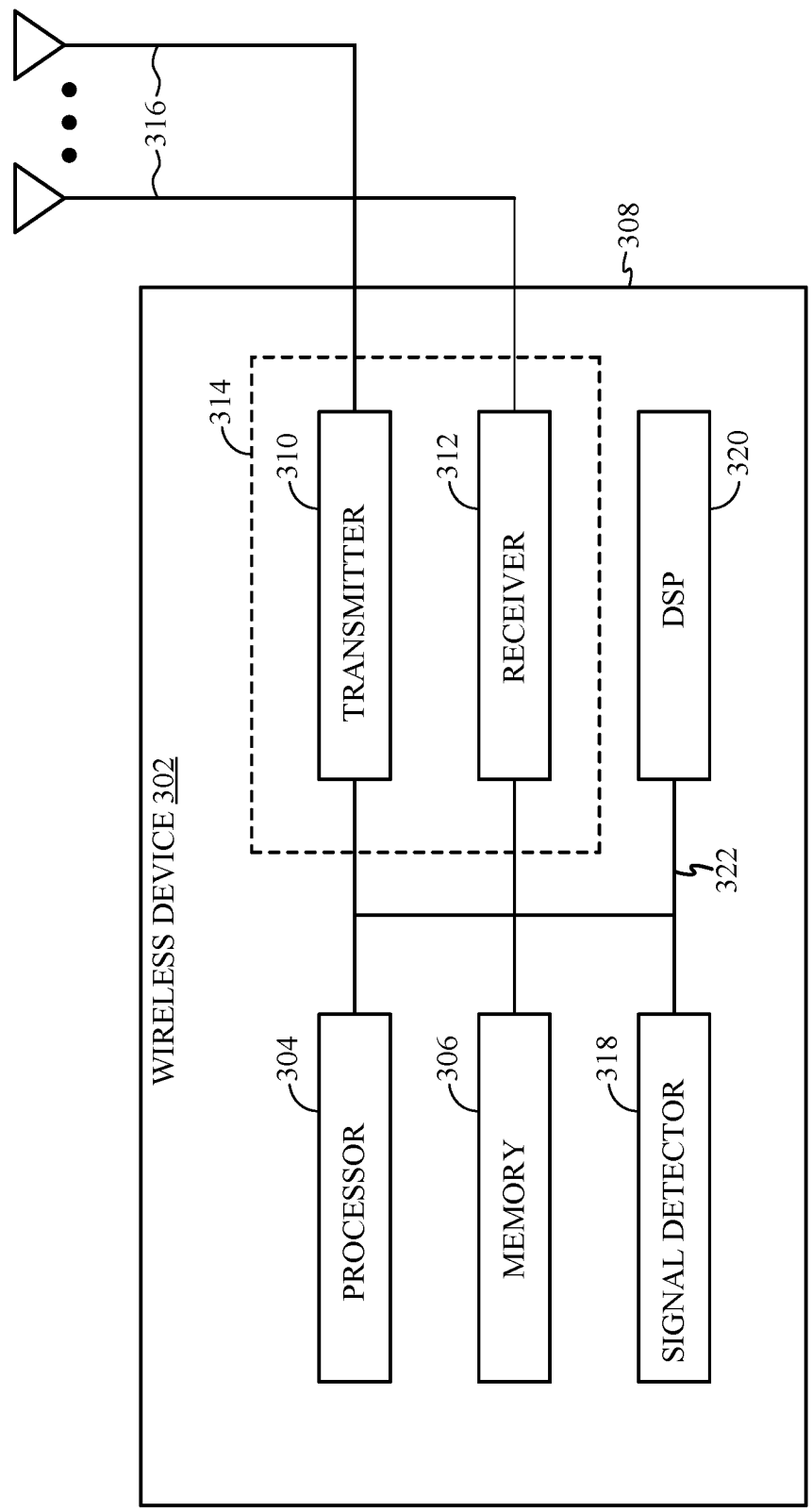
FIG. 3 illustrates an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations described herein. The wireless device 302 may be an access point 110 or a station 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Neighbor Aware Network

Due to the increasing popularity of location-enabled (e.g., GPS-enabled) mobile devices, neighbor aware networks (NANs) are emerging. A NAN may refer to a network for communication between wireless nodes (e.g., stations (STAs)) that are located in close proximity to each other. A NAN provides a mechanism for devices to synchronize the time and channel on which the devices converge to facilitate the discovery of services that have been made discoverable on the existing devices in a NAN or new devices that enter the environment.

A coordination window may refer to the time and channel on which networking devices converge. That is, devices in a network may converge on a set of time and frequency resources for exchanging (e.g., transmitting, receiving) information regarding the network, referred to as a networking coordination window. A collection of devices that are synchronized to a same coordination window schedule may be referred to as a NAN cluster.

Figure 4:
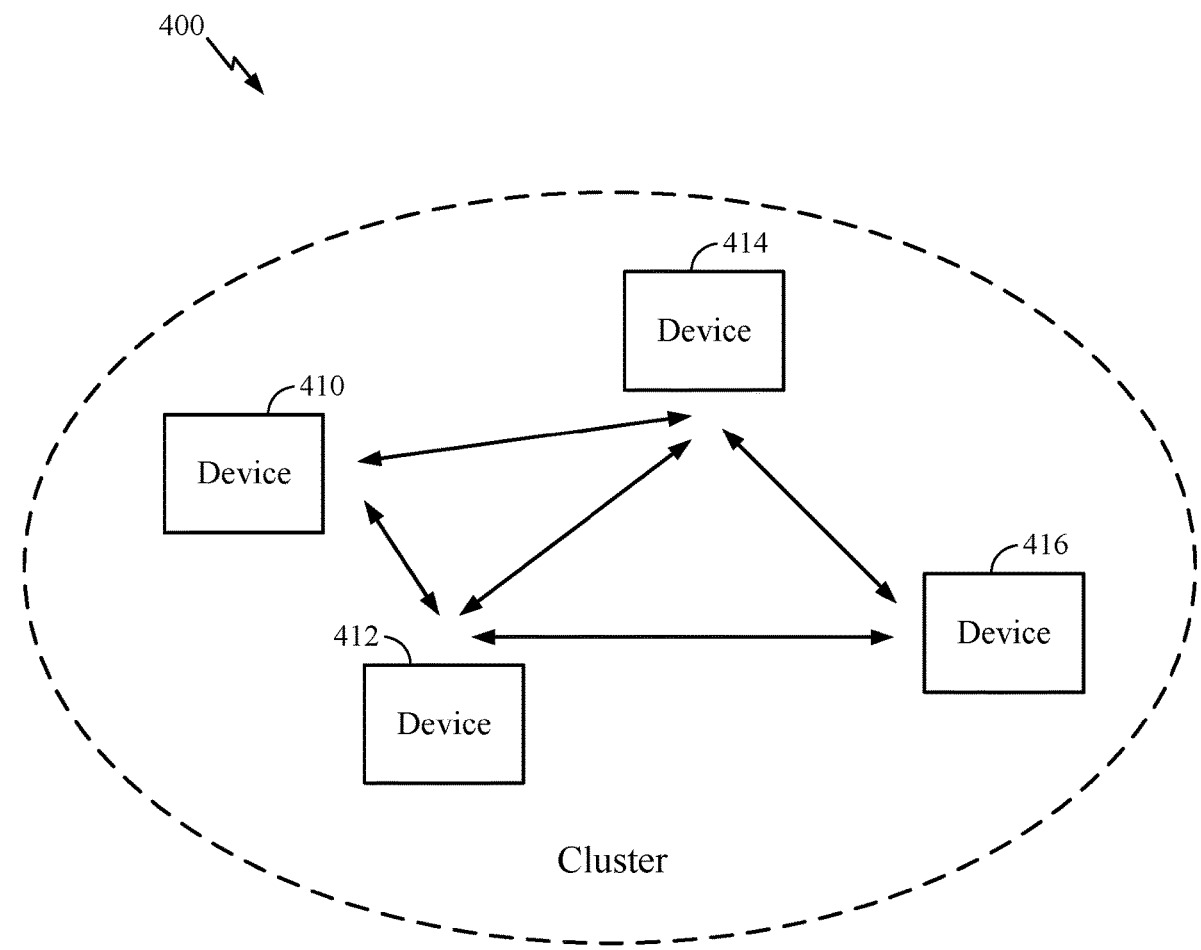
FIG. 4 illustrates an example networking cluster, in accordance with certain aspects of the present disclosure.

FIG. 4 illustrates an example cluster 400, in accordance with certain aspects of the present disclosure. Devices (e.g., such as AP 110 or user terminal 120) 410, 412, 414, 416 that are part of the same cluster participate in a master Selection procedure. Depending on changes in the cluster, such as devices becoming part of or leaving the cluster and master ranks of those devices, different devices may be elected to become devices in master role for the cluster at different times.

Figure 5:
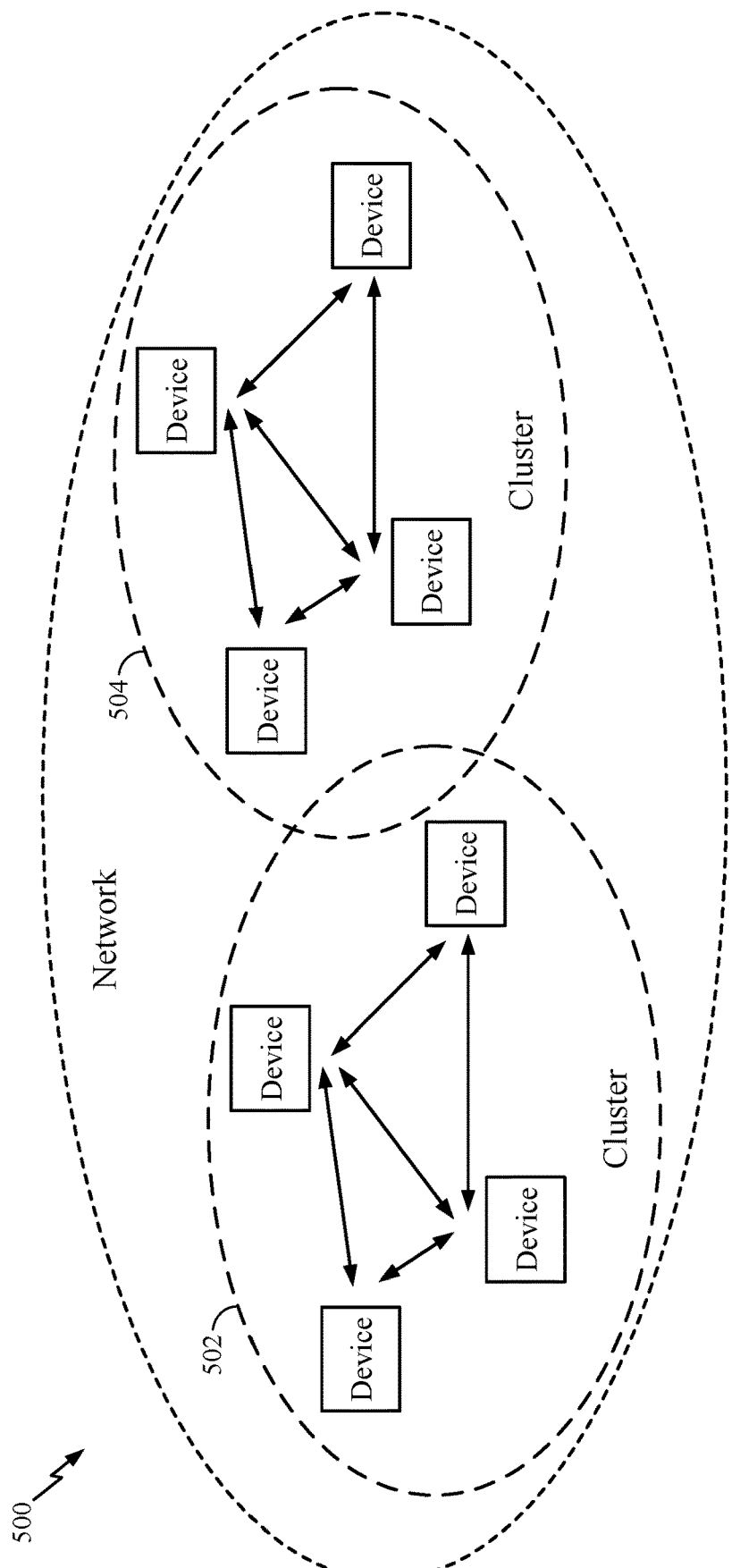
FIG. 5 illustrates an example network with overlapping networking clusters, in accordance with certain aspects of the present disclosure.

An identifier (ID) may be used to signify a set of parameters (e.g., discovery channels, discover window times). A network may refer to a collection of clusters that share the same ID, FIG. 5 illustrates an example network 500 with overlapping clusters 502, 504, in accordance with certain aspects of the present disclosure. Although not shown in FIG. 5, a device may participate in more than one overlapping cluster. Also not shown, a device may operate concurrently in a network with other types of WiFi networks (e.g., STAs in different homes or buildings as part of independent LANs with different external network connections), such as a wireless local area network (WLAN) or WiFi Direct.

A coordination window may be used to advertise the existence of devices, services offered, and synchronization information. During the coordination window, devices may be available (e.g., the devices power on receiver components to listen for transmissions and make themselves available) with high probability for mutual discovery. During interim periods, the devices may be asleep (e.g., in a low power mode with one or more receiver components powered down) or involved with other activities, for example, communicating on other networks and/or a different channel. A device that creates the cluster may define a series of coordination window start times for coordination windows of the cluster, described below.

Devices participating in the same Cluster are synchronized to a common clock. During a coordination window, one or more devices transmit synchronization beacon frames (also referred to as beacon frames and beacons) to help all devices within the cluster synchronize their clocks. A timing synchronization function (TSF) keeps the timers of all devices in the same cluster synchronized. The TSF in a cluster may be implemented via a distributed algorithm, and beacon frames can be transmitted (e.g., by one or more devices in the cluster) according to the algorithm described. A relative starting point or "time zero" may be defined as the first coordination window start time. According to certain aspects, all devices in the network may wake up at the first coordination window, which may be defined, for example, as the coordination window in which the lower 23 bits of a value of the TSF are zero. During subsequent coordination windows, certain devices may choose to be awake (e.g., wake up if in a power save mode) or not be awake (e.g., enter or remain in a power save mode). Synchronization may decrease the discovery latency of devices, power consumption by devices, and medium occupancy by devices that would otherwise occur.

The synchronization procedure is separate from service discovery messaging. Although a device may not transmits more than one synchronization beacon in a coordination window, multiple service discovery frames may be transmitted by a device in a coordination window. Service discovery frames make services discoverable by other devices, possibly enabling devices to look for services from other devices.

Each device within a network may have an anchor master rank. The anchor master rank may indicate, for example, the relative accuracy of a clock associated with the device. Devices within a network may synchronize clocks with the device in the network having a highest anchor master rank (e.g., the device indicated as having the most accurate clock).

Figure 6:
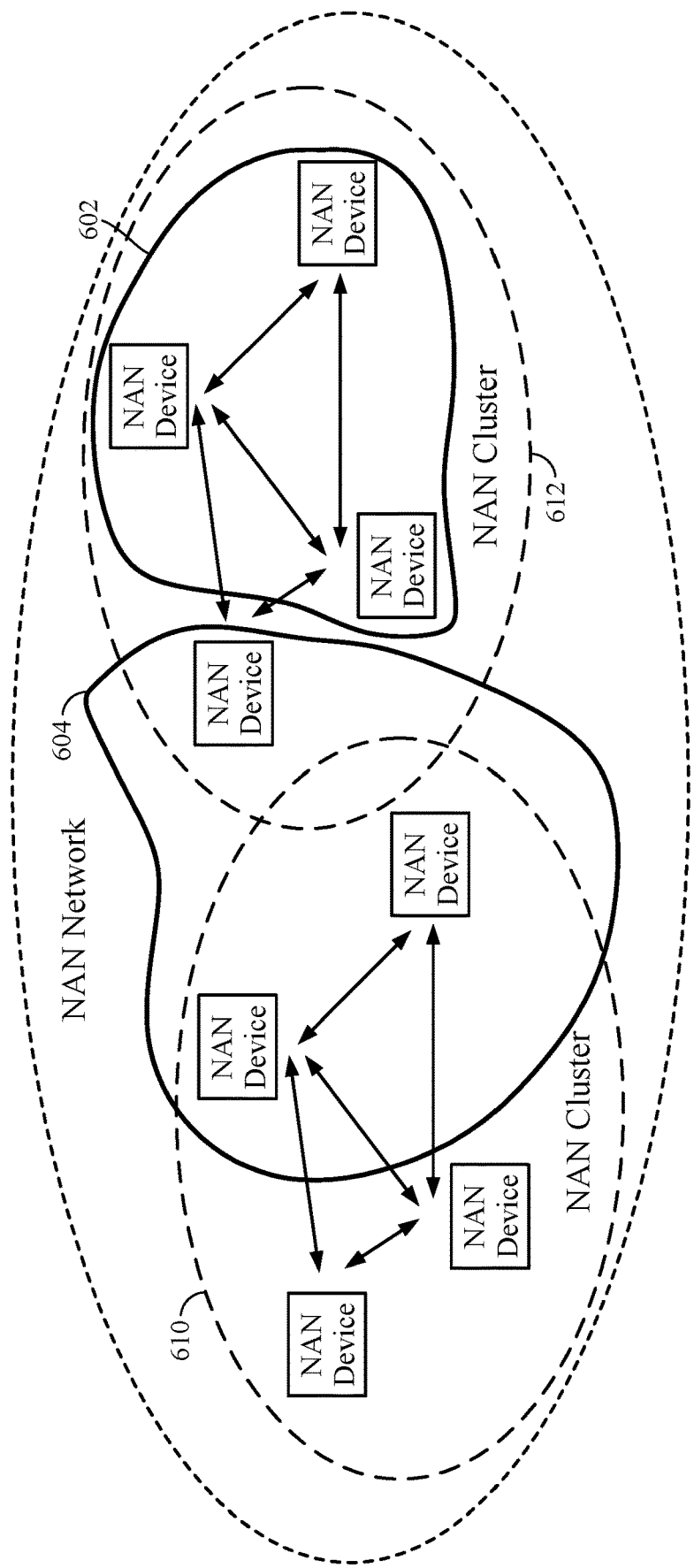
FIG. 6 illustrates a networking data link (NDL) cluster formed from a plurality of devices that are members of at least one networking cluster, in accordance with certain aspects of the present disclosure.

In some cases, as illustrated in FIG. 6, a data link cluster 602, 604 may be formed from a plurality of devices that are members of at least one cluster 610, 612. A data link cluster may comprise members of a single cluster, as illustrated by data link cluster 602, or members of multiple clusters, as illustrated by data link cluster 604. A member of a data link cluster may perform data communications within the data link cluster, but not necessarily with other members of the network to which the member belongs. Devices within a data link cluster may perform communications within the data link cluster outside of a coordination window and not concurrently with transmissions within the network.

Figure 7:
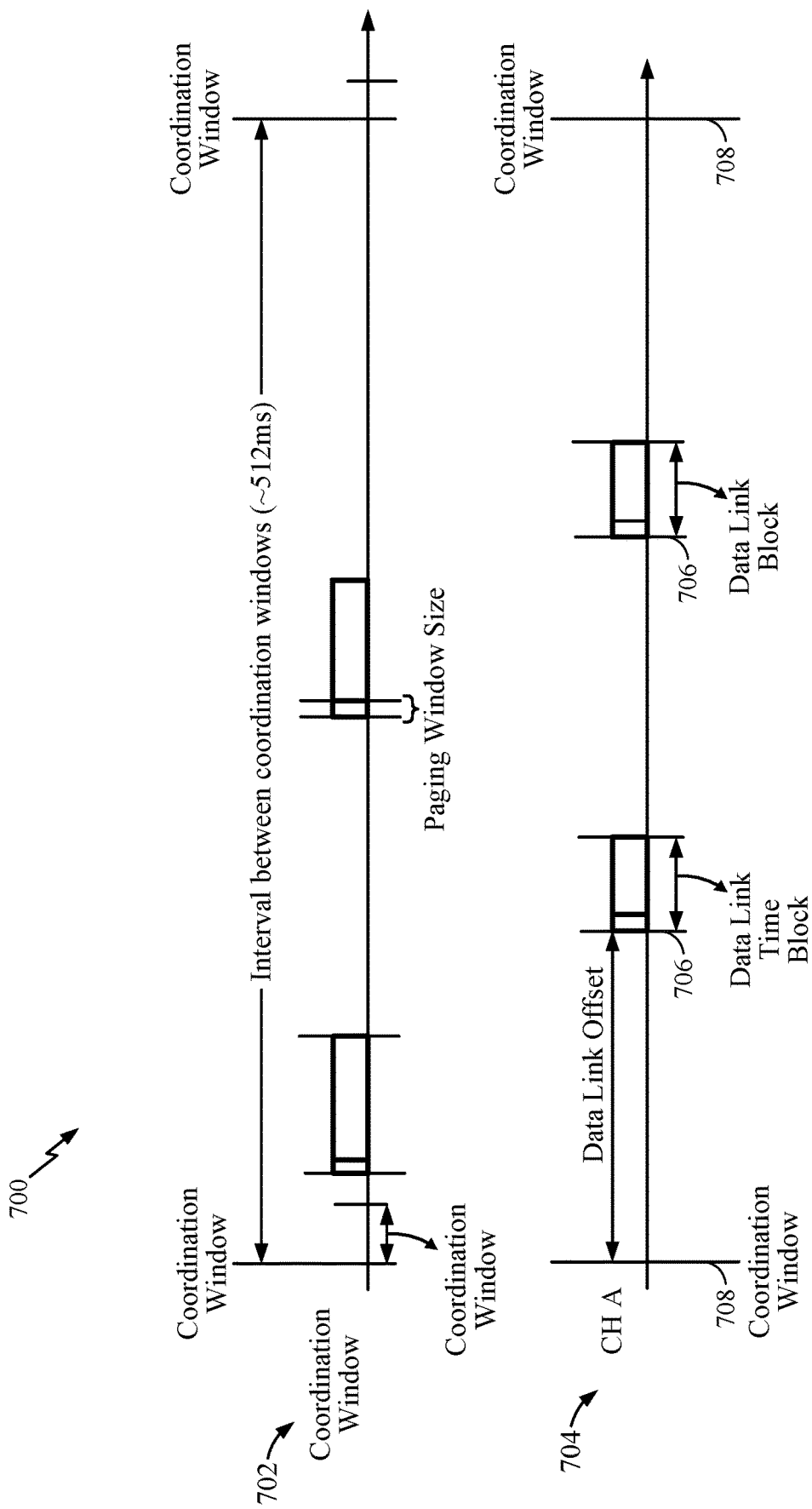
FIG. 7 illustrates an example timeline of communications within a networking cluster and an NDL cluster, in accordance with certain aspects of the present disclosure.

FIG. 7 illustrates an example timeline 700 of communications within a cluster and a data link cluster. As illustrated, on the coordination channel 702, coordination window start times 708 have an interval of 512 time units (TUs) (i.e., the beginning of a coordination window is 512 TUs after the beginning of a previous coordination window). Data link time blocks 706, in which communications such as those shown on channel A 704 may be performed within the data link cluster, may be offset in time from the coordination window start time. In some cases, data link time block times may be set at fixed offsets, relative to the coordination window timeline. That is, each data link time block time may begin a fixed offset from a corresponding coordination window start time. Data link time block times may occur according to a data link base schedule. Devices within a data link cluster may receive information regarding the data link base schedule from other devices within the data link cluster, and may negotiate the data link base schedule with the other devices.

When a data link cluster is initialized, a data link timeline may be determined based on the coordination window timeline of the originating cluster (e.g., the originating cluster). Once the data link cluster is initialized, the data link cluster may maintain a timeline that is independent of a coordination window timeline. The data link timeline may not shift, even as the originating cluster changes. If all devices in the data link cluster are members of the same cluster, the data link clock may be synchronized with the clock.

In a dynamic environment, changes in a cluster with which a member of a data link cluster is associated may in turn cause a shift in a coordination window timeline of the cluster. If, for example, data link time block times are set as a fixed offset from coordination window start times as mentioned above, the data link may fail due to cluster timing changes causing different devices in the data link cluster to calculate different data link time block times. Since the devices in the data link cluster may calculate different data link Time Block times, data transmission in the data link may be misaligned, causing data communication failures between some devices in the data link cluster. Thus, techniques for synchronizing timing within a data link cluster may be desirable.

Example Coordinated Beamforming (COBF) Protocol

Multiple stations may belong to different basic service sets (BSSs) and be associated with different access points (APs). The different BSSs may be within communication range of each other such that communications between APs and stations (STAs) of the different BSSs may interfere with each other. Certain aspects of the present disclosure provide techniques for performing coordinated beamforming (CoBF) allowing multiple BSSs to carry out simultaneous transmissions during the same transmit opportunity (TXOP).

Figure 8A:
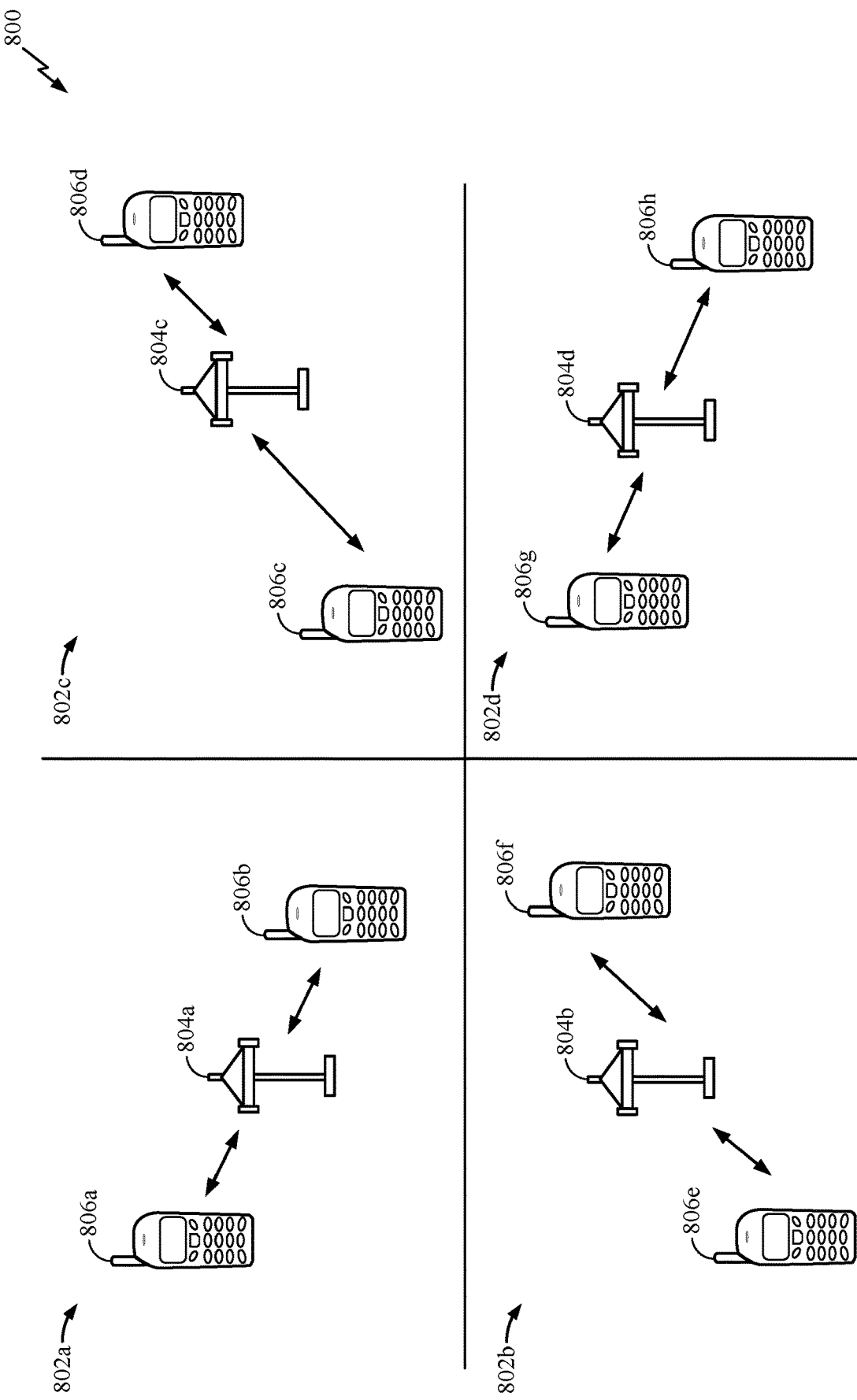
FIG. 8A illustrates a communication system having four basic service sets (BSSs), each BSS including an access point respectively, in accordance with certain aspects of the present disclosure.

FIG. 8A illustrates a communication system 800 having four basic service sets (BSSs) 802a-d, each BSS including an access point 108a-d respectively. As illustrated, STAs 806a and 806b may be associated with AP 804a in BSS 802a. Each of the APs may identify re-use and non-reuse STAs in its own BSS. A reuse STA may refer to a STA that can be scheduled in a CoBF TXOP without being nulled by other participating AP. In other words, a reuse STA (e.g., STA 806a) may be positioned such that a downlink (DL) transmission from its own AP (e.g., AP 804a) does not cause interference with DL transmissions in other BSSs. On the other hand, a non-reuse STA is a STA (e.g., STA 806b) that is positioned such that a DL transmission from its own AP (e.g., AP 804a) causes interference with DL transmissions in other BSSs. Non-reuse STAs may be scheduled in a CoBF TXOP with nulling to avoid interfering with transmission from other APs participating in that TXOP.

Each AP 804a-d is associated with at least two STAs within its respective BSS 802a-d. AP 804a is associated with STA 806a-b. AP 804b is associated with STA 806c-d. AP 804c is associated with STA 806e-f. AP 804d is associated with STAs 806g-h. An AP that is associated with a STA may be referred to as a BSS AP for the STA. Similarly, an AP for which there is no association with a particular STA may be referred to as an OBSS AP for the STA. Associations between an AP and one or more STAs provides for, in part, coordination of communication between devices within the BSS defined by the AP and its associated STAs. For example, devices within each BSS may exchange signals with each other. The signals may function to coordinate transmissions from the respective AP and stations within the AP's BSS.

The devices shown in FIG. 8A, including the AP's 804a-d and STA 806a-h, also share a wireless medium. Sharing of the wireless medium is facilitated, in certain aspects, via the use of carrier sense media access with collision detection (CSMA/CD). The disclosed aspects herein may provide for a modified version of CSMA/CD that provides for an increase in an ability for the BSSs 802a-d to communicate simultaneously when compared to known systems.

The STAs 806a-h within the BSSs 802a-d may have different abilities to receive transmissions from their associated APs based, at least in part, on their position relative to the other APs 804a-d and/or STAs outside their respective BSS. For example, because the STAs 806a, 806d, 806e, and 806h (e.g., reuse STAs) are positioned relatively far from OBSS APs, these stations may have an ability to receive transmissions from their respective BSS AP even when an OBSS AP or STA is transmitting, as previously described. Reuse STAs may have sufficient signal to noise ratios (SINRs) with OBSS APs that they may communicate with other STAs and/or APs without having to be nulled.

In contrast, STAs 106b, 106c, 106f, and 106g (e.g., non-reuse STAs) are illustrated in positions that are relatively close to an OBSS AP. Thus, these stations may have less ability to receive transmissions from their BSS AP during transmissions from OBSS AP's and/or OBSS STAs, as previously described. Non-reuse STAs may have insufficient signal to noise ratios (SINRs) with OBSS APs that they may be nulled in order to communicate with other STAs and/or APs while communications are occurring involving the OBSS APs. In certain aspects, the disclosed methods and systems may provide for an improved ability for the non-reuse STAs to communicate concurrently while other OBSS devices are also communicating on the wireless medium.

In at least some of the disclosed aspects, two or more of the APs 804a-d may negotiate to form a cluster of APs. In other aspects, cluster configurations may be defined via manual configuration. For example, each AP may maintain configuration parameters indicating whether the AP is part of one or more cluster, and if so, a cluster identifier for the cluster. In some aspects, the configuration may also indicate whether the AP is a cluster controller for the cluster. In certain aspects, a cluster controller may take on functions that differ from APs that are part of the cluster but are not a cluster controller. Thus, in some aspects, two or more of APs 804a-d may be included in the same cluster. STAs associated with those APs may also be considered to be included in or part of the cluster of their associated AP. Therefore, in some aspects, the STAs a-h illustrated above may be part of the same cluster.

The cluster of APs may coordinate transmissions between themselves and their associated APs. In some aspects, the cluster may be identified via a cluster identifier that uniquely identifies the group of APs comprising the cluster. In some aspects, during association of a STA with any of the APs in a cluster, the cluster identifier is transmitted to the station during association, for example, in an association response message. The STA may then use the cluster identifier to coordinate communications within the cluster. For example, one or more messages transmitted over the wireless network may include the cluster identifier, which a receiving STA may use to determine whether the message is addressed to it or not.

In certain aspects, APs may also use various methods to identify STAs within the cluster. For example, where a technique used to generate association identifiers (AIDs) does not provide uniqueness across APs, media access control (MAC) addresses may be used to identify STAs where appropriate. For example, messages including user info fields that use AIDs to identify STAs may be modified to contain data derived from STA MAC addresses. Alternatively, methods of generating association identifiers may be modified to ensure uniqueness within a cluster of access points. For example, a portion of the AID may uniquely identify an AP within the cluster. STAs associated with that AP would be assigned AIDs including the unique identification. This provides unique AIDs across APs within a cluster. In some other aspects, an AID within a cluster may include the cluster identifier. This may provide for uniqueness across clusters to facilitate future cross-cluster coordination of communication.

Figure 8B:
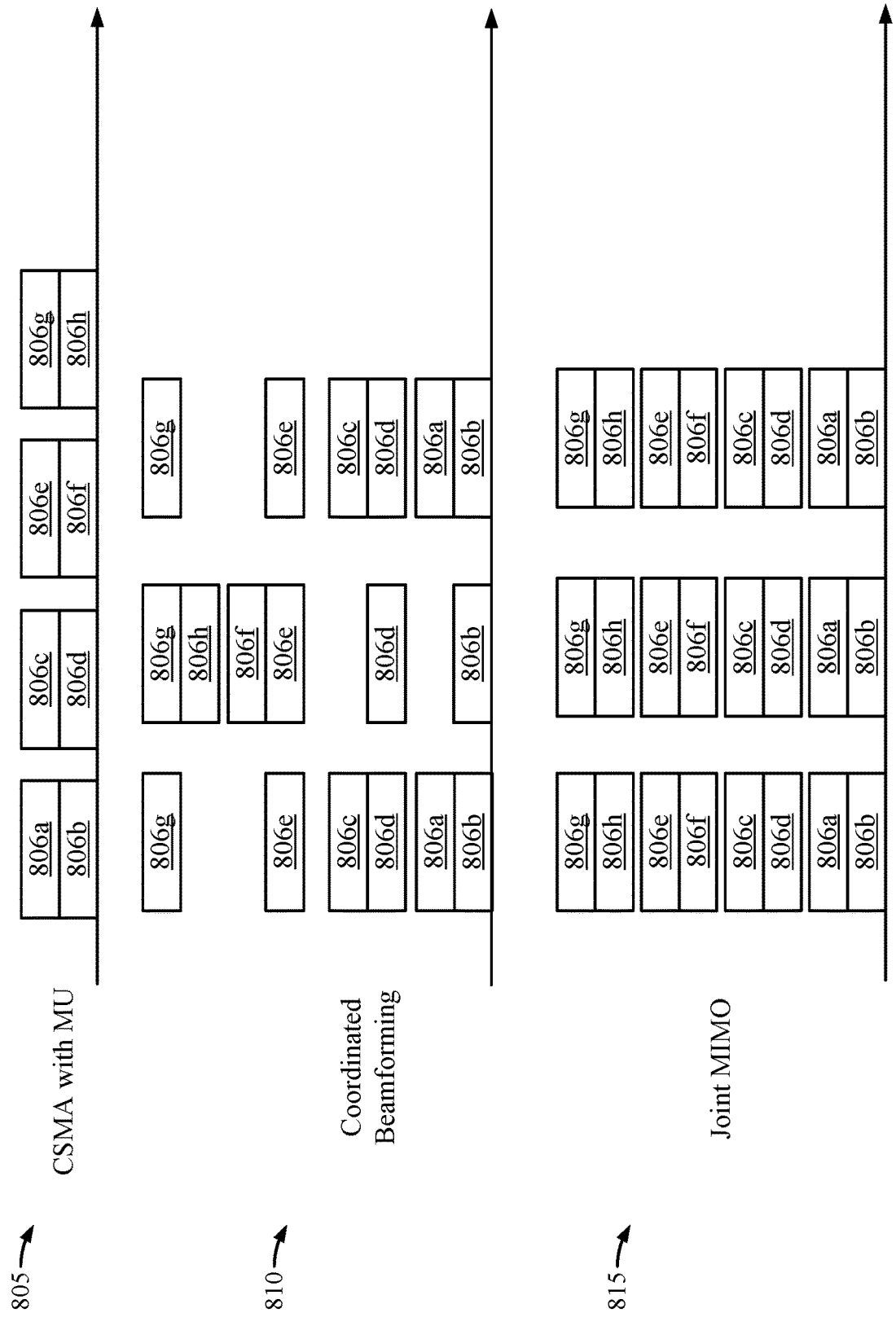
FIG. 8B shows three example approaches to arbitrating a wireless medium, in accordance with certain aspects of the present disclosure.

FIG. 8B shows three example approaches to arbitrating the wireless medium with the communications system 800. Approach 805 uses carrier sense media access (CSMA) to perform single BSS multi-user transmissions. For example, each of transmissions 820a-d may be performed by the BSSs 802a-d of FIG. 8 respectively. The use of traditional CSMA in approach 805 causes the medium to be used by only one BSS at any point in time.

Approach 810 uses coordinated beamforming (COBF). With the coordinated beamforming approach 810, the APs 804a-d may coordinate transmissions between their respective BSSs. In some aspects, this coordination may be performed over the wireless medium, or in some aspects, over a back-haul network. In these aspects, the coordination traffic over the backhaul network provided for improved utilization of the wireless medium.

With this approach, reuse STAs for different BSSs may be scheduled to transmit or receive data concurrently. For example, a relative strength of a communication channel between STA 806a and AP 804a may allow these two devices to exchange data simultaneously with communication with OBSS devices, such as, for example, AP 804b and STA 806d. In addition, approach 810 provides for non-reuse STAs to be scheduled to transmit concurrently with OBSS devices. For example, STA 806b, which is within BSS 802, may be scheduled to communicate simultaneous with communication between AP 804d and STA 806h of BSS 802d. Such simultaneous communication between a non-reuse STA (such as STA 806b) and, for example, AP 804d may be facilitated by scheduling AP 804d to transmit a signal to STA 806b simultaneous with AP 804d's transmission to STA 806h. For example, AP 804d may transmit a null signal for dominant interfering signals to STA 806b. Thus, while transmitting a first signal to STA 806h, AP 804d may simultaneously transmit a signal nulling the first signal to STA 806b. Such simultaneous transmission by the AP 804d may be provided by selecting individual antenna(s) of a plurality of antennas provided by AP 804d for each of the transmissions. Such nulling may create reuse opportunities for otherwise non-reuse STAs. COBF may operate in both DL and UL directions with the APs nulling respective frequencies.

Approach 815 shows an example joint multi-user communication or a distributed MIMO communication across APs 804a-d within the BSSs 802a-d. With this joint MIMO approach 815, a cluster of APs (such as APs 804a-d) may service N 1-SS STAs simultaneously, where N is ~¾ of a total number of antennas across all APs within the cluster. Distributed MIMO communications may coordinate a collection of antennas across the multiple APs within a cluster to transmit to STAs within the cluster. Thus, while traditional MIMO methods allocate transmit antennas within a single BSS to STAs within the BSS, distributed MIMO provides for allocation of transmit antennas outside a BSS to facilitate communications with STAs within the BSS.

In a distributed MIMO communication, a station in one BSS may communicate with one or more APs in another, different BSS. Thus, for example, station 806a of BSS 802a of FIG. 8 may communicate with AP 804d, which is in BSS 802d. This communication may occur simultaneously with communication between STA 806a and AP 804a, the BSS AP of the STA 806a. In some aspects of an uplink distributed MIMO communication, the STA 806a may conduct one or more uplink communications to AP 804a simultaneously with AP 804d. Alternatively, a downlink distributed MIMO communication may include AP 804a transmitting data to STA 806a simultaneously with a transmission from AP 804d to STA 806a.

Thus, one or more of the aspects described herein may use MIMO in the form of Cooperative Multipoint (CoMP, also referred to as e.g. Network MIMO (N-MIMO), Distributed MIMO (D-MIMO), or Cooperative MIMO (Co-MIMO), etc.) transmission, in which multiple access points maintaining multiple corresponding basic service sets, can conduct respective cooperative or joint communications with one or more STAs 806. CoMP communication between STAs and APs can used for example, a joint processing scheme, in which an AP associated with a STA and an AP that is not associated with the STA cooperate to engage in transmitting downlink data to the STA and/or jointly receiving uplink data from the STA. Additionally or alternatively, CoMP communication between an STA and multiple APs can use coordinated beamforming, in which a BSS AP and an OBSS AP can cooperate such that an OBSS AP forms a spatial beam for transmission away from the BSS AP and, in some aspects, at least a portion of its associated stations, thereby enabling the BSS AP to communicate with one or more of its associated stations with reduced interference.

To facilitate the coordinated beamforming approach 810 or the joint MIMO approach 815, an understanding of channel conditions between an AP and OBSS devices may provide for greater wireless communication efficiency.

Figure 9:
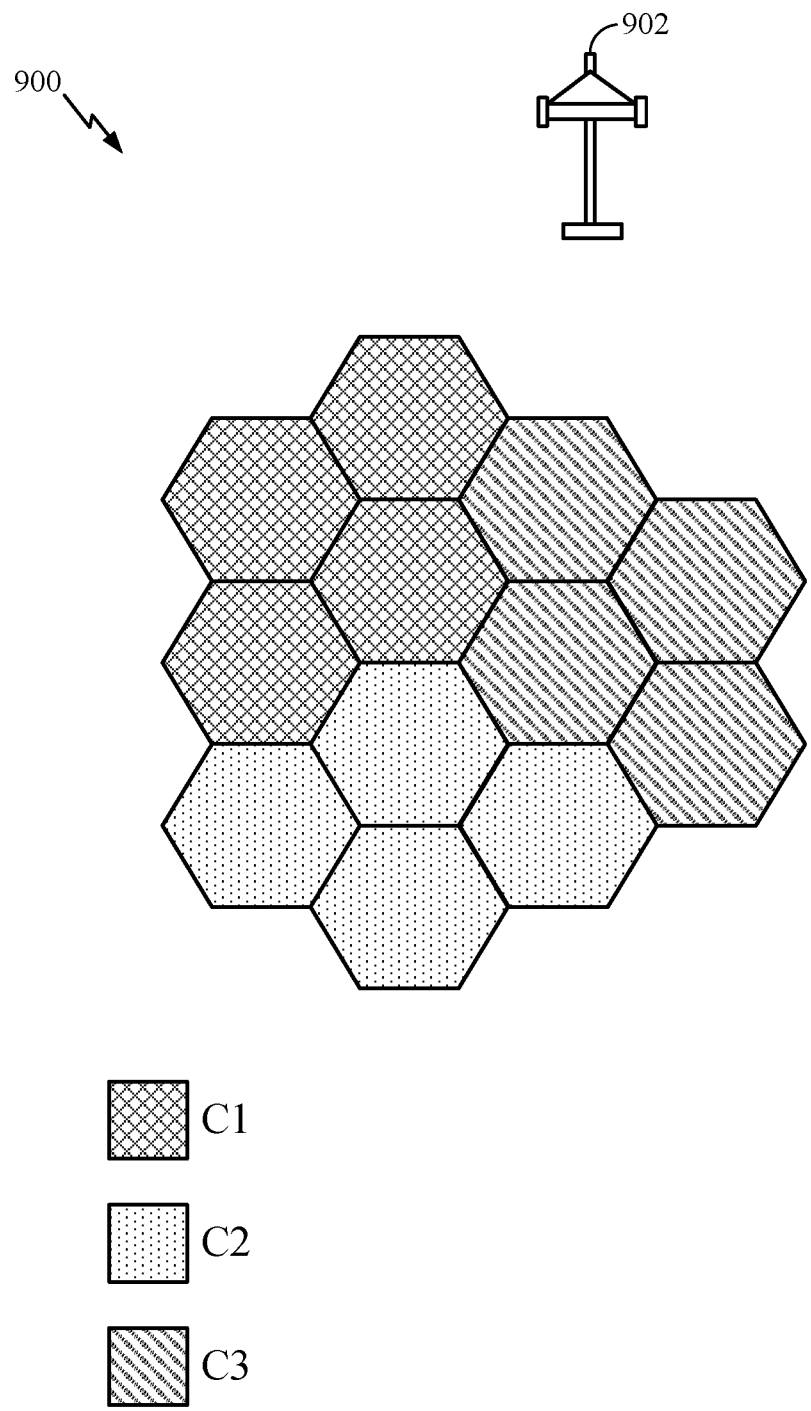
FIG. 9 schematically illustrates a plurality of basic service sets (BSSs) of an example distributed MIMO wireless communication system, in accordance with certain aspects of the present disclosure.

FIG. 9 schematically illustrates a plurality of basic service sets (BSSs) 900 of an example distributed MIMO wireless communication system. Each hexagon of FIG. 5 represents an AP and associated STAs, collectively referred to as a BSS. The individual BSSs are grouped into clusters in accordance with certain aspects described herein. In the example schematically illustrated by FIG. 5, a first cluster (C1) comprises four BSSs, a second cluster (C2) comprises four BSSs, and a third cluster (C3) comprises four BSSs. In certain other aspects, a cluster can comprise 2, 3, 4, 5, or any numbers of BSSs and a wireless communication system can comprise one or more clusters (e.g., 2, 3, 4, 5 or other numbers of clusters). A cluster controller 902 is also shown. The cluster controller 902 may comprise an AP (e.g., AP 804a) or another standalone component as described herein. The cluster controller 902 may identify clusters of BSSs based on various BSS parameters.

In certain aspects, to perform distributed MIMO communications, devices within two or more BSSs of a cluster may transmit over a single channel simultaneously (e.g., transmit data from a plurality of access points of the BSS simultaneously via the single channel, or transmit data from a plurality of stations in different BSSs simultaneously to a single AP). In some aspects, a centralized scheduler (not shown) may coordinate transmissions across the clusters C1-C3. For example, coordination may include selecting which devices will transmit simultaneously from multiple BSSs to perform a joint MIMO communication.

Under European Telecommunications Standard Institute (ETSI) regulations, wireless communication systems are generally required to use clear channel assessment (CCA) or listen-before-talk (LBT) before allowing access to the wireless network. Generally, two different access modes are allowed in such wireless communication systems: "frame-based" access mode and "load-based" access mode. To use coordinated access in an unlicensed spectrum, it is generally desirable for a device on the wireless network to use a safe or allowed mechanism for ignoring same-network deferral while honoring LBT toward other devices on the wireless network. A similar issue arises with licensed assisted access (LAA) systems, which are bound to a fixed frame structure. However, in wireless communication systems which are not bound to a fixed frame structure (e.g., WiFi), a more flexible and/or efficient solution may be used. Certain aspects described herein advantageously provide a way to enable reuse (e.g., STAs able to be served simultaneously without having to be nulled) by synchronizing the physical layer convergence procedure (PLCP) protocol data unit (PPDU) start time, which may be seen as a forced collision. In certain such aspects, the timing scheme is configured so that energy detect (ED) or power detect (PD) operations do not trigger within the same wireless network at the start of a frame (e.g., having a standard that defines requirements for CCA timing and synchronization).

For CoBF, an AP (e.g., AP 804a) may serve its own STAs (e.g., STA 806a and STA 806b), and use under-utilized antennas to send null (e.g. a null beam) to outer BSS (OBSS) non-reuse STAs to reduce interference. Thus, increasing the number of AP antennas is key to improving CoBF opportunities. There may be no need for an AP to send nulls to OBSS reuse STAs as they are not positioned in such a manner as to be vulnerable to interference from the AP, as described. In some cases, the communication system as described herein may be a managed network where one AP (e.g., AP 804a) has control over the operations of the other APs (e.g., AP 804b, AP 804c, and AP 804d), or may be an unmanaged network where the APs operate independently.

An AP that obtains (e.g., controls) a TXOP becomes may be referred to as the leader AP for that TXOP. The leader AP may be the owner of the TXOP, and may allow other APs to join the leader for the CoBF join transmission using the TXOP. The leader AP may invite other APs to join a CoBF transmission during the TXOP with some constraints. For example, the leader AP may identify the non-reuse STAs in its own BSS that are scheduled for that TXOP and may need nulling if other APs transmit during the TXOP. The identity of those STAs may be included in the invite signaling to let other APs know that if they choose to accept the invitation to participate in the CoBF, they should have the capability to send nulls to the identified non-reuse STAs. Thus, the APs that participate in the CoBF transmission during the TXOP may send nulls to the identified non-reuse STAs in the invite signaling. By default, invited APs may schedule only their reuse STAs during the TXOP, but with implementation of CoBF, invited APs are able to schedule their non-reuse STAs as well.

Example Techniques for Synchronization in Access Point (AP) Coordination

Certain aspects of the present disclosure generally provide techniques for performing timing synchronization to facilitate coordination of communications by multiple access points (APs). There are several levels of AP coordination. For example, level 1 coordination may be implemented without synchronization. That is, APs may coordinate with each other to share load information, user-management, admission control, and basic service set (BSS) transition management (e.g., handover between BSSs).

Level 2 coordination may be implemented with loose synchronization. For instance, APs may coordinate with each other for interference management, and simultaneous uplink (UL)/downlink (DL) transmission during a transmit opportunity (TXOP). Level 2 coordination aims to achieve coordination with loose synchronization between the APs. Neighboring APs may not be in range of each other and hence may be unable to directly coordinate or synchronize their transmissions.

Level 3 coordination may involve tight (e.g., symbol level) synchronization. For example, APs may coordinate with each other for coordinated beamforming (CoBF), where an AP sends null signals to stations of another BSS to reduce interference, as described in more detail herein. Level 3 coordination involves tighter synchronization between APs as compared to level 2 coordination. APs may be in range of each other, however, the timing synchronization function (TSF) granularity (e.g., in μseconds) may not be sufficient for CoBF operation (e.g., especially after accounting for clock drift between the APs). Level 4 coordination may involve tight (sub-symbol level) synchronization, where APs can coordinate with each other for joint multiple-input multiple-output (MIMO) transmission and where a station is simultaneously served by multiple APs.

Certain aspects of the present disclosure provide techniques for timing synchronization, which may facilitate AP coordination (e.g., level 2 and level 3 coordination). For example, for level 2 coordination, an AP may setup service periods (SPs) (e.g., broadcast-target wakeup time (B-TWT)

SPs) such that they are either aligned or orthogonalize with SPs setup by neighboring APs, as will be described in more detail herein. AP's in the neighborhood may not be in range of each other. However, associated stations may be located in the coverage area of an outer BSS (OBSS). Therefore it is beneficial to align or orthogonalize transmissions in each BSS. Thus, what is needed are techniques for gathering initial TSF and/or SP schedule of APs in the neighborhood even when the APs are not in communication range, and moreover, techniques for correcting the clock drift between the APs.

Certain aspects provide a NAN based synchronization technique which may provide initial synchronization and correction of clock drift. Certain aspects of the present disclosure also provide a synchronization technique implemented without NAN, which may involve a technique for performing initial synchronization, and a supplementary technique for correcting clock drift. The NAN based technique is described in more detail with respect to FIG. 10.

Figure 10:
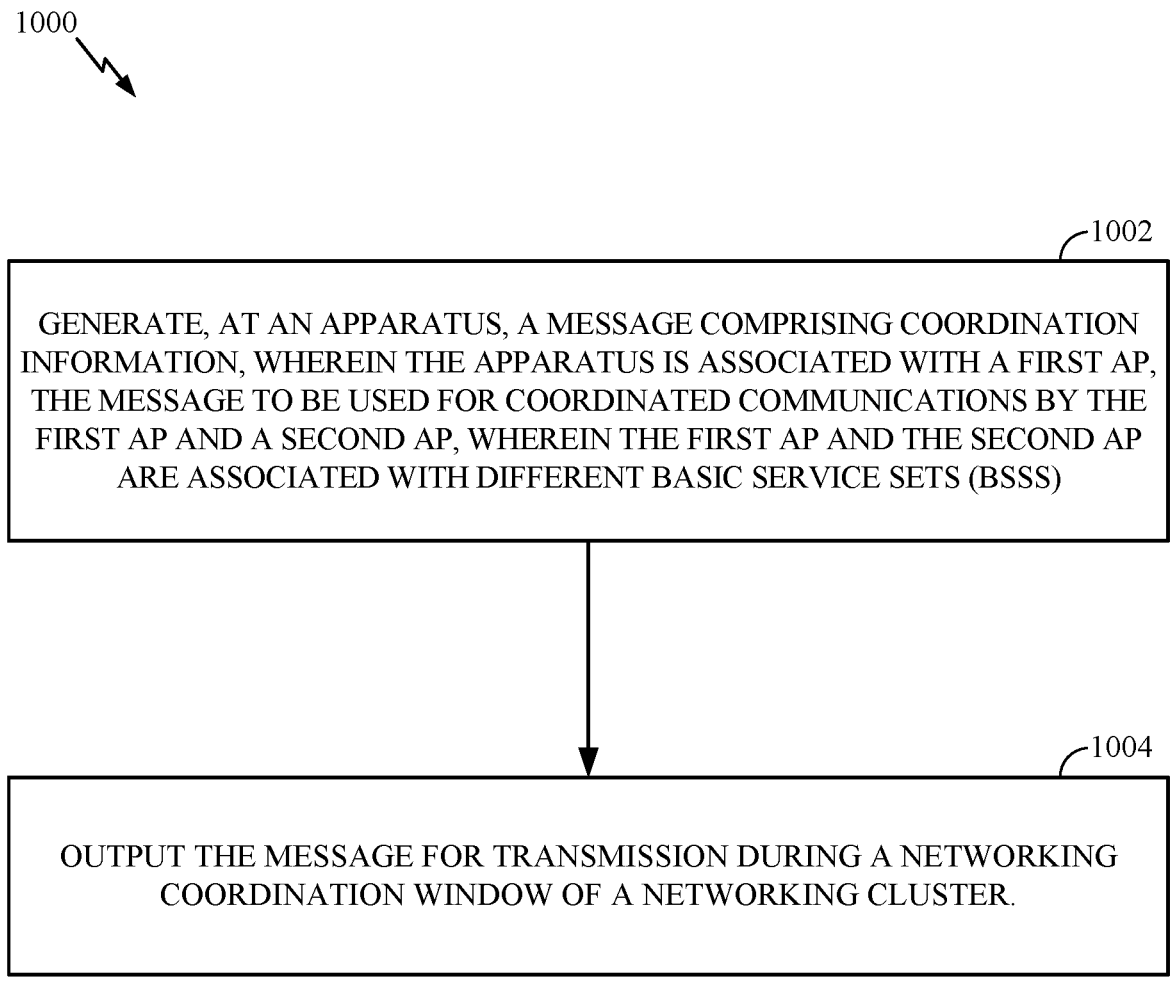
FIG. 10 is a flow diagram of example operations for wireless communication by an AP using a NAN based scheme, in accordance with certain aspects of the present disclosure.

FIG. 10 is a flow diagram of example operations 1000 for wireless communication, in accordance with certain aspects of the present disclosure. The operations 1000 may be performed by an apparatus (e.g., an apparatus associated with a first AP).

Operations 1000 may be implemented as software components that are executed and run on one or more processors (e.g., controller 230 of FIG. 2). Further, the transmission and reception of signals by the AP in operations 1000 may be enabled, for example, by one or more antennas (e.g., antennas 224 of FIG. 2). In certain aspects, the transmission and/or reception of signals by the AP may be implemented via a bus interface of one or more processors (e.g., controller 230) obtaining and/or outputting signals.

The operations 1000 begin, at block 1002, by the apparatus generating a message comprising SP information. The apparatus may be associated with (e.g., hosted by) a first AP, and the message may be used for coordinated communications by the first AP and a second AP. In certain aspects, the first AP and the second AP may be associated with different BSSs. At block 1004, the apparatus outputs the message for transmission during a network coordination window of a network cluster.

For example, the networking coordination window may be a time period during which various wireless nodes may contend for resources during a communication period. For example, the first AP may select one or more time slots during the communication period which may be used by the first AP and associated stations for communication. In this manner, the stations of the first AP may enter a low-power state of operation, and only wake up to communicate during the one or more time slots selected by the first AP of the BSS. Other APs may also contend, during the networking coordination window, for one or more other time slots of the communication period. In some cases, the first AP may receive an indication of the one or more other time slots that are selected by the one or more other APs (e.g., second AP), allowing the first AP to contend for (e.g., select) other time slots during the communication period for the BSS of the first AP.

In certain aspects, the operations 1000 may also include assigning a wireless node (e.g., client associated with AP such as a station, or a neighboring AP) to participate in the networking cluster to synchronize clocks of the first AP and the second AP. For example, when the first AP and the second AP are not within communication range of each other, the wireless node may act as a proxy for communications between the first AP and the second AP. That is, the wireless node may rebroadcast messages on behalf of the APs. If the AP is advertising coordination information (e.g., a TSF and/or a SP or updates to a previously scheduled SP), the station may advertise this information during the coordination window. Moreover, the station may forward any messages that the station receives during the coordination window from other participating APs to the station's associated AP.

In certain aspects, a filtering mechanism may be implemented to avoid duplicate transmissions when there are multiple stations designated as proxies within the same BSS. For example, stations in the BSS may take turns forwarding messages between the APs.

Figure 11:
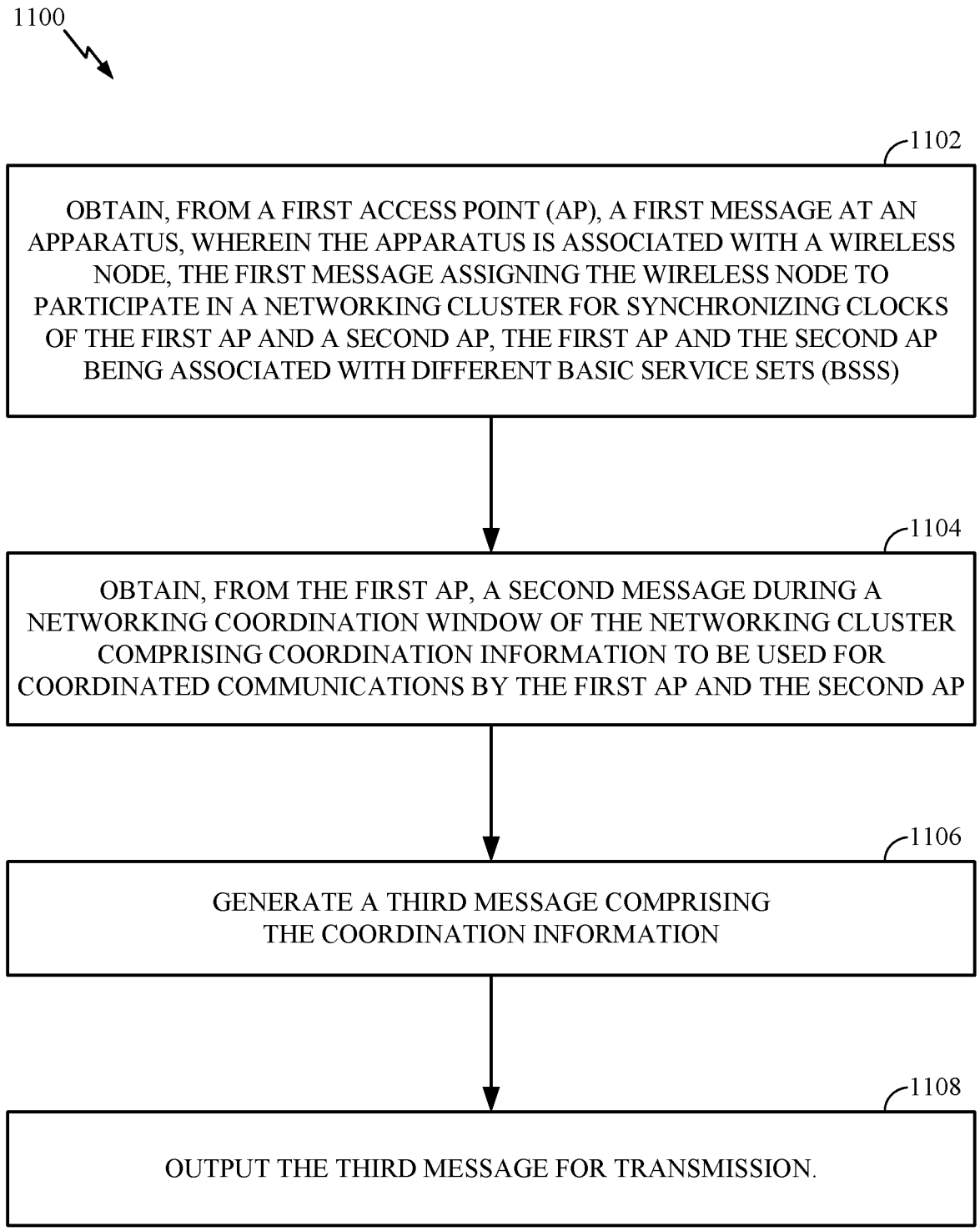
FIG. 11 is a flow diagram of example operations for wireless communication by a station using a NAN based scheme, in accordance with certain aspects of the present disclosure.

FIG. 11 is a flow diagram of example operations 1100 for wireless communication, in accordance with certain aspects of the present disclosure. The operations 1100 may be performed by an apparatus (e.g., e.g., an apparatus associated with a wireless node, such as a station). The operations 1100 may be complimentary operations by the stations to the operations 1000 performed by the AP.

Operations 1100 may be implemented as software components that are executed and run on one or more processors (e.g., controller 280 of FIG. 2). Further, the transmission and reception of signals by the station in operations 1100 may be enabled, for example, by one or more antennas (e.g., antennas 252 of FIG. 2). In certain aspects, the transmission and/or reception of signals by the station may be implemented via a bus interface of one or more processors (e.g., controller 280) obtaining and/or outputting signals.

The operations 1100 begin, at block 1102, by the apparatus obtaining, from a first AP, a first message. In certain aspects, the apparatus is associated with (e.g., hosted by) a wireless node (e.g., client associated with AP such as a station, or a neighboring AP), and the first message assigns the station to participate in a networking cluster for synchronizing clocks of the first AP and a second AP, the first AP and the second AP being associated with different BSSs. At block 1104, the apparatus may obtain, from the first AP, a second message during coordination window of the network cluster comprising coordination information (e.g., at least one of SP information or synchronization information) to be used for coordinated communications by the first AP and the second AP. At block 1106, the apparatus generates a third message comprising the coordination information (e.g., at least one of the SP information or synchronization information), and at block 1108, outputs the third message for transmission.

In other words, in an AP coordination scheme, neighboring APs may form a networking cluster to synchronize their clocks. Since the APs may not be in communication range of each other, APs may assign certain wireless nodes (e.g., stations) to participate in the networking cluster to propagate coordination information and advertisements on their behalf.

In certain aspects, the operations 1000 also include the apparatus selecting the wireless node from a plurality of wireless nodes (e.g., stations) based on a condition of the wireless node. For example, in order to ensure fairness and adequate coverage, APs may round-robin stations that participate in the network (e.g., NAN) such that no one station is overburdened. In certain aspects, the AP may select stations that have adequate battery life and/or transmit power capability. In certain aspects, the AP may select stations based on their locations. That is, the AP may select a station that is capable of communicating with both APs and facilitate forwarding of communications (e.g., coordination information) between the APs.

APs in the networking cluster would be able to maintain the same TSF (clock), since the devices in the networking cluster synchronize every coordination window (e.g., 512 ms), as described herein. Frequent synchronization would also account for any clock drift between the APs, and therefore, would address both initial synchronization and clock drift. APs may exchange coordination information (e.g., SP information) or any updates to a previously SP schedule/parameters during the networking coordination window. The designated stations act as proxies to their associated AP, as described herein.

Figure 12:
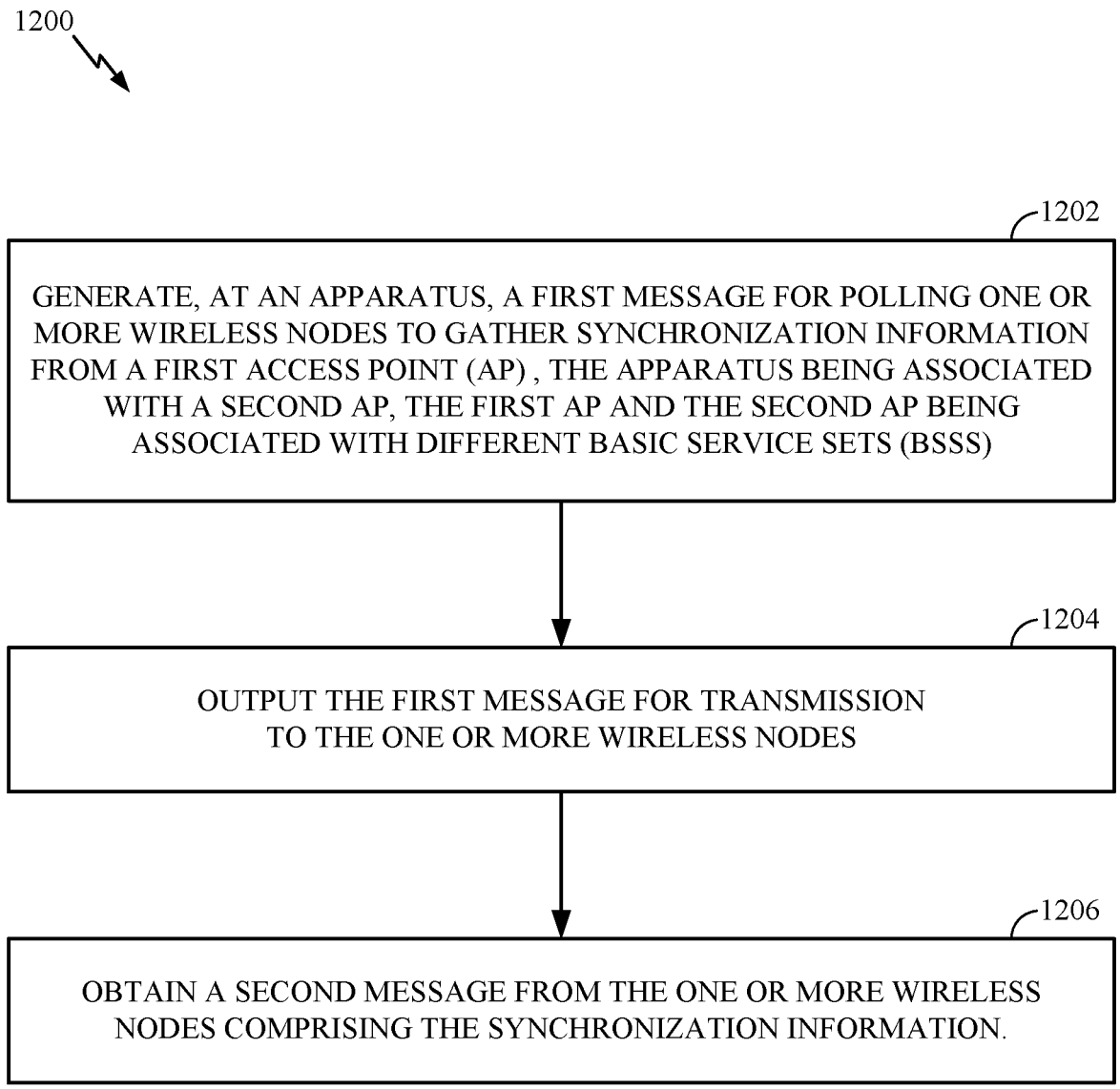
FIG. 12 is a flow diagram of example operations for wireless communication by an AP, in accordance with certain aspects of the present disclosure.

Certain aspects provide a coordination technique implemented by sending a message to a station, polling the station to gather coordination (e.g., synchronization) information from one or more APs of other BSSs, as described in more detail with respect to FIG. 12.

FIG. 12 is a flow diagram of example operations 1200 for wireless communication, in accordance with certain aspects of the present disclosure. The operations 1200 may be performed by an apparatus (e.g., associated with an AP).

Operations 1200 may be implemented as software components that are executed and run on one or more processors (e.g., controller 230 of FIG. 2). Further, the transmission and reception of signals by the AP in operations 1200 may be enabled, for example, by one or more antennas (e.g., antennas 224 of FIG. 2). In certain aspects, the transmission and/or reception of signals by the AP may be implemented via a bus interface of one or more processors (e.g., controller 230) obtaining and/or outputting signals.

The operations 1200 begin, at block 1202, by the apparatus generating a first message for polling one or more stations to gather synchronization information from a first AP. The apparatus may be associated with (e.g., hosted by) a second AP, the first AP and the second AP being associated with different BSSs. At block 1204, the apparatus outputs the first message for transmission to the one or more stations, and at block 1206, obtains a second message from the one or more stations comprising the synchronization information.

Figure 13:
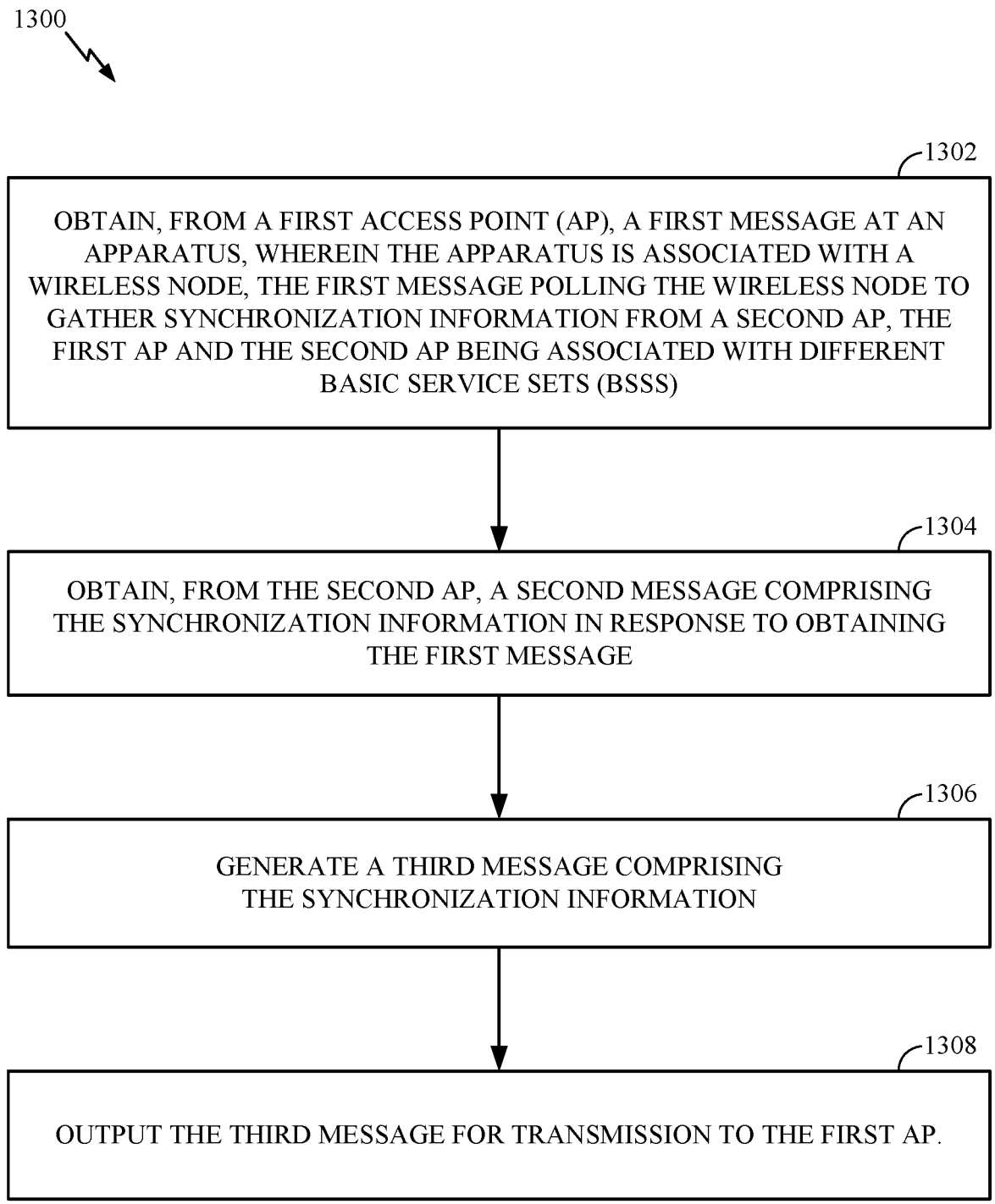
FIG. 13 is a flow diagram of example operations for wireless communication by a station, in accordance with certain aspects of the present disclosure.

FIG. 13 is a flow diagram of example operations 1300 for wireless communication, in accordance with certain aspects of the present disclosure. The operations 1300 may be performed by an apparatus (e.g., associated with a station).

Operations 1300 may be implemented as software components that are executed and run on one or more processors (e.g., controller 280 of FIG. 2). Further, the transmission and reception of signals by the station in operations 1300 may be enabled, for example, by one or more antennas (e.g., antennas 252 of FIG. 2). In certain aspects, the transmission and/or reception of signals by the station may be implemented via a bus interface of one or more processors (e.g., controller 280) obtaining and/or outputting signals.

The operations 1300 begin, at block 1302, by obtaining, from a first AP, a first message. In certain aspects, the apparatus is associated with a wireless node (e.g., hosted by a station), the first message polling the wireless node to gather coordination (e.g., synchronization) information from a second AP, the first AP and the second AP being associated with different BSSs.

At block 1304, the apparatus obtains, from the second AP, a second message comprising the coordination information in response to obtaining the first message, at block 1306, generates a third message comprising the coordination information, and at block 1308, outputs the third message for transmission to the first AP.

For unmanaged APs, an AP interested in coordination gathers coordination information (TSF/SP information) by polling associated stations. For example, the AP requests an associated station to provide a beacon report (e.g., an 11 k beacon report), which includes a TWT element and a TSF advertised in the beacon of neighboring APs. The beam report may be requested by sending a request and extended request elements to the station. The request may include one or more identifiers, each of which may correspond to a set of default requested elements.

In certain aspects, the coordination information (e.g., synchronization and/or SP information) may be requested via an event request/report mechanism (e.g., 11 v event request/report mechanism). An event request/report mechanism may involve requesting specific information from stations and the response to the request may be tailored towards the request. Therefore, the event request/report mechanism may be more efficient than the 11 k beacon report. For example, a new request type and format may be defined for a corresponding response. In some cases, the coordinating APs may be managed (e.g., via enterprise deployment). In this case, the initial TSF and B-TWT schedule may be pre-configured for the APs.

For both managed and unmanaged APs, an AP's clock may drift overtime with respect to other APs. Since both the 11 k beacon report and the 11 v based event reporting involve additional frame exchanges and the content of these frames may be large, an efficient supplementary scheme may be implemented to correct the clock drift of the APs. For example the clock drift can be tracked and corrected if each AP regularly advertises TSF. However, TSF also involves a large number of bits that are communicated. If synchronization is advertised frequently to correct clock drift, there may be little drift to correct, in which case, advertising a partial TSF (e.g., 4 or 8 bits), having a lower number of bits than TSF (e.g., 16 bits), may be sufficient.

In certain aspects, a partial TSF may be carried in one or more fields of a preamble of a data unit. For example, the preamble may include SIG fields (e.g., legacy or high efficiency (HE) SIG fields) and training fields (e.g., legacy or HE long and short training fields). In certain aspects, the partial TSF may be carried in a SIG field of a data unit (e.g., trigger-based (TB) PPDU), such as HE SIG-A fields of an HE trigger-based (TB) PPDU. For instance, SIG fields in an HE TB PPDU or fields in an AP's trigger frame (TF) may be used to propagate the APs TSF. Transmissions of stations may be used to propagate AP's timing information. Neighboring APs receive the stations TB response and derive the timing information to coordinate their reuse stations.

In certain aspects, the partial TSF may be encoded in spatial reuse (SR) fields of the HE SIG-A field. That is, the HE SIG-A of a TB PPDU may include four SR fields (e.g., each SR field being four bits) that indicate SR criteria for different sub-bands. However, because APs coordinate to perform re-use, the SR fields may be unused in a setup where APs are already participating in coordination. Thus, the SR fields may be encoded with the partial TSF.

The HE SIG-A2 field in a TB PPDU may also contain reserved fields (e.g., nine reserved fields), which may also be encoded with the partial TSF. Thus, an AP may provide the values for the SR and reserved fields in an eliciting TF, and responding stations may use the values from the TF to set the RE-SIG-A/A2 field of their respective HE TB PPDU transmissions. That is, responding stations set the values of the four SR fields and the A2 fields in the HE SIG-A field based on the values specified by the AP in the soliciting TF (e.g., corresponding fields in the common info field of the TF). An AP participating in coordination may set the value of the corresponding fields in the common info field to carry coordination information including the partial TSF, which may be relayed by the station to another AP for coordination.

In certain aspects, partial TSF may be carried in the preamble of the HE TB PPDU sent by associated stations in response to AP's soliciting TF. An AP transmitting a TF determines the expected time of the transmission of TB PPDU by the station and encodes the preamble to the corresponding partial TSF. In other words, the AP encodes the TF with a time stamp (partial TSF) that coincides with the transmission time of the TB PPDU by the station. APs interested in re-use, upon hearing TB PPDUs from OBSS STAs, may either align their respective clocks with the triggering OBSS AP or locally account for the drift with respect to the triggering OBSS AP, as described with respect to FIG. 14.

Figure 14:
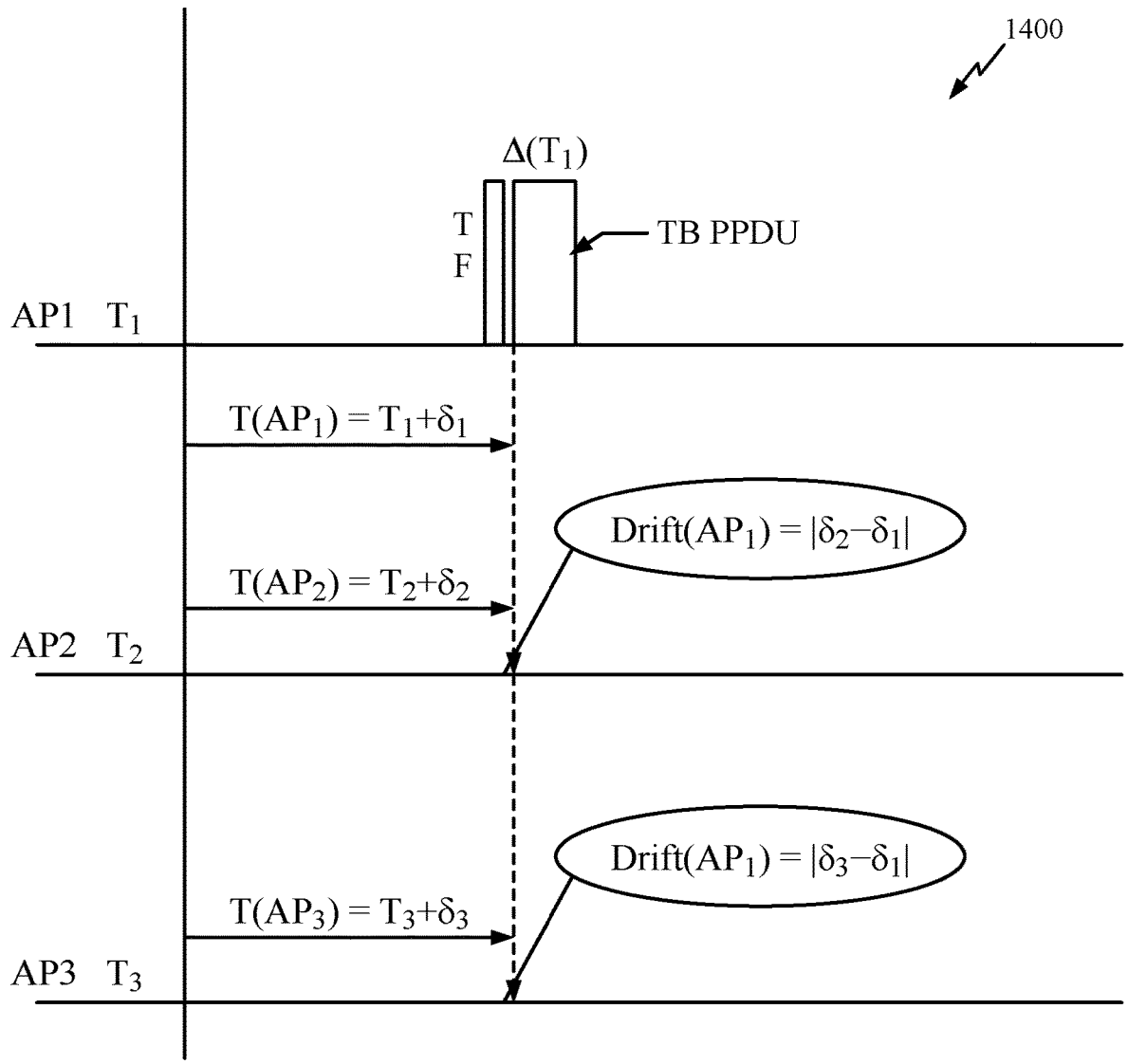
FIG. 14 is a timing diagram illustrating clock drift of multiple APs, in accordance with certain aspects of the present disclosure.

FIG. 14 is a timing diagram 1400 illustrating clock drift of multiple APs, in accordance with certain aspects of the present disclosure. As illustrated, the current clock time T of AP1 (e.g., $T(AP_1)$) may be equal to a clock time ($T_1$) plus a first clock drift ($\delta_1$), and the current clock time T of AP2 (e.g., $T(AP_2)$) may be equal to a clock time ($T_2$) plus a second clock drift ($\delta_2$). Therefore, clock drift of AP1 (e.g., $Drift(AP_1)$) may be equal to the absolute value of $\delta_2$-$\delta_1$. As illustrated, the drift is calculated based on a time stamp at the beginning of the TB PPDU.

Certain aspects of the present disclosure provide techniques for indicating a configuration of a data unit. For example, an AP may send an indication that SIG fields (e.g., HE SIG-A fields) of a data unit have been encoded with synchronization information. For example, fields or field values in the AP's TF common information may include a reserved bit which may be used to signal that SR and/or A2 fields of a SIG-A field carries a partial TSF. In certain aspects, certain reserved field values (e.g., guard interval (GI) and long training field (LTF) type subfield equal to three) may indicate the new configuration of the data unit.

Certain aspects may include a new type of TF. For example, a new TF variant may include a partial TSF subfield in place of SR or A2 subfield in the common info field. In certain aspects, a reserved bit (e.g., bit 23) of the HE-SIG-A field may be used to indicate the data unit configuration. For example, a value of 0 for this bit may indicate that either the SR and/or A2 field is encoded with a partial TSF. In some cases, certain field values in the SIG-A field may indicate a special meaning, indicating to a station that the data unit carries a partial TSF.

Figure 15:
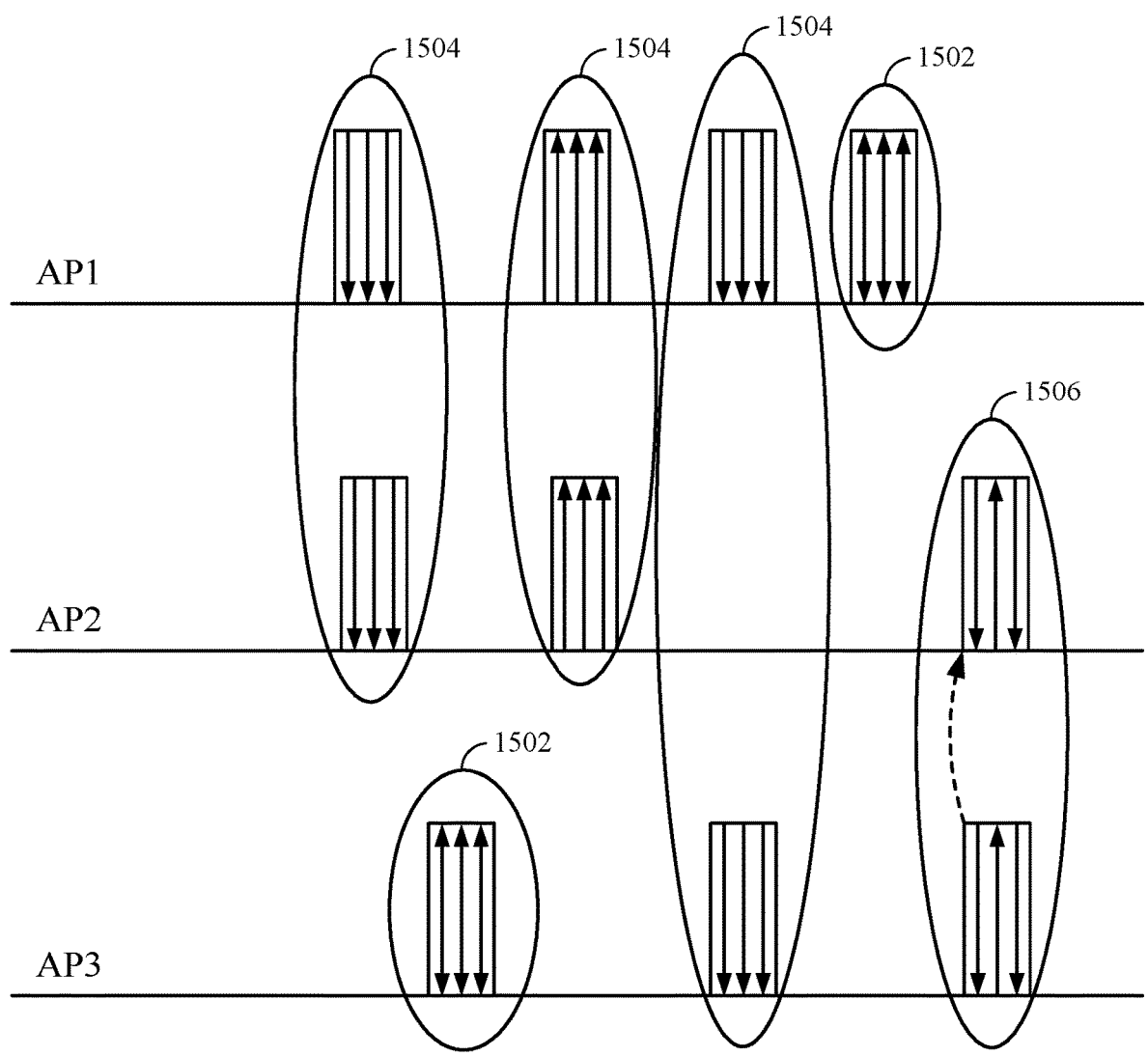
FIG. 15 illustrates multiple communication protocols, in accordance with certain aspects of the present disclosure.

FIG. 15 illustrates multiple communication protocols, in accordance with certain aspects of the present disclosure. After synchronizing the clocks of the APs and communicating service period information, as described herein, the APs may perform coordinated communications. The communication occasions 1502 may involve using orthogonal TWT SPs. For example, when B-TWT are orthogonalized, there may be no restriction on the traffic directionality. Thus, the SP in each of the communication occasions 1502 include transmissions in both directions between an AP and a station, as illustrated. APs may avoid neighboring AP's TWT to reduce cross interference.

The communication occasions 1504 use synchronized and aligned TWTs. For example, when B-TWTs are aligned, transmission may be directional (e.g., UL or DL). In this case, the soliciting and response frames from an AP (e.g., TF for soliciting UL and acknowledgment (ACK)/block ACK (BA) response to DL) may be short, and/or may involve signaling (e.g., via a bit in TWT element) to identify whether the corresponding TWT-SPs is for DL or UL signaling. In other words, the SPs of each of the communication occasions 1504 may be restricted to either DL signaling or UL signaling, as illustrated. The communication occasion 1506 uses aligned collaborative TWTs. For example, the APs may coordinate within each SP to synchronize UL/DL transmissions. That is, the APs may determine at the beginning of the SP what would be the directionality of traffic during the SP.

Certain aspects of the present disclosure provide techniques for performing synchronization for level 3 coordination (e.g., coordination with tight (symbol level) synchronization). It may be assumed that APs are within communication range of each other when implementing level 3 coordination. Participating APs coordinate their transmissions at the symbol level. AP(s) send null signals to OBSS stations when reusing the medium for in-BSS transmission. Such symbol level coordination may involve timing granularity that is higher than what is currently implemented. In certain aspects, synchronization for level 3 coordination may involve an AP sending a multi-AP TF to neighboring APs to solicit a list of stations for which they have buffered DL traffic, the multi-AP TF having synchronization information. The granularity of the synchronization information may be higher than conventional implementations, as described in more detail with respect to FIGS. 16 and 17.

Figure 16:
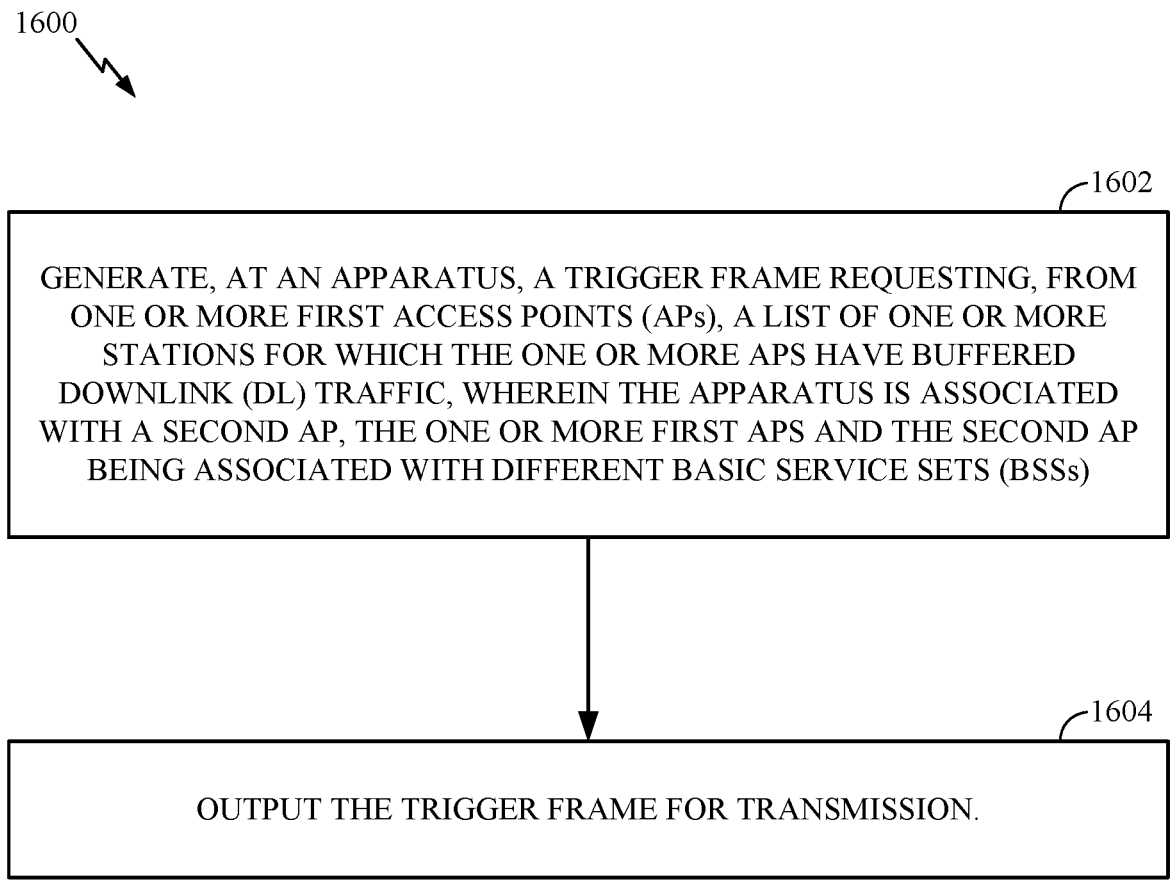
FIG. 16 is a flow diagram of example operations for wireless communication by a leader AP for coordinated beamforming, in accordance with certain aspects of the present disclosure.

FIG. 16 is a flow diagram of example operations 1600 for wireless communication, in accordance with certain aspects of the present disclosure. The operations 1600 may be performed by an apparatus (e.g., hosted by a leader AP).

Operations 1600 may be implemented as software components that are executed and run on one or more processors (e.g., controller 230 of FIG. 2). Further, the transmission and reception of signals by the AP in operations 1600 may be enabled, for example, by one or more antennas (e.g., antennas 224 of FIG. 2). In certain aspects, the transmission and/or reception of signals by the AP may be implemented via a bus interface of one or more processors (e.g., controller 230) obtaining and/or outputting signals.

The operations 1600 begin, at block 1602, by the apparatus generating a trigger frame requesting, from one or more first APs, a list of one or more stations for which the one or more APs have buffered DL traffic. In certain aspects, the apparatus is associated with (e.g., hosted by) a second AP (e.g., a leader AP), the one or more first APs and the second AP being associated with different BSSs. At block 1604, the apparatus outputs the trigger frame for transmission.

Figure 17:
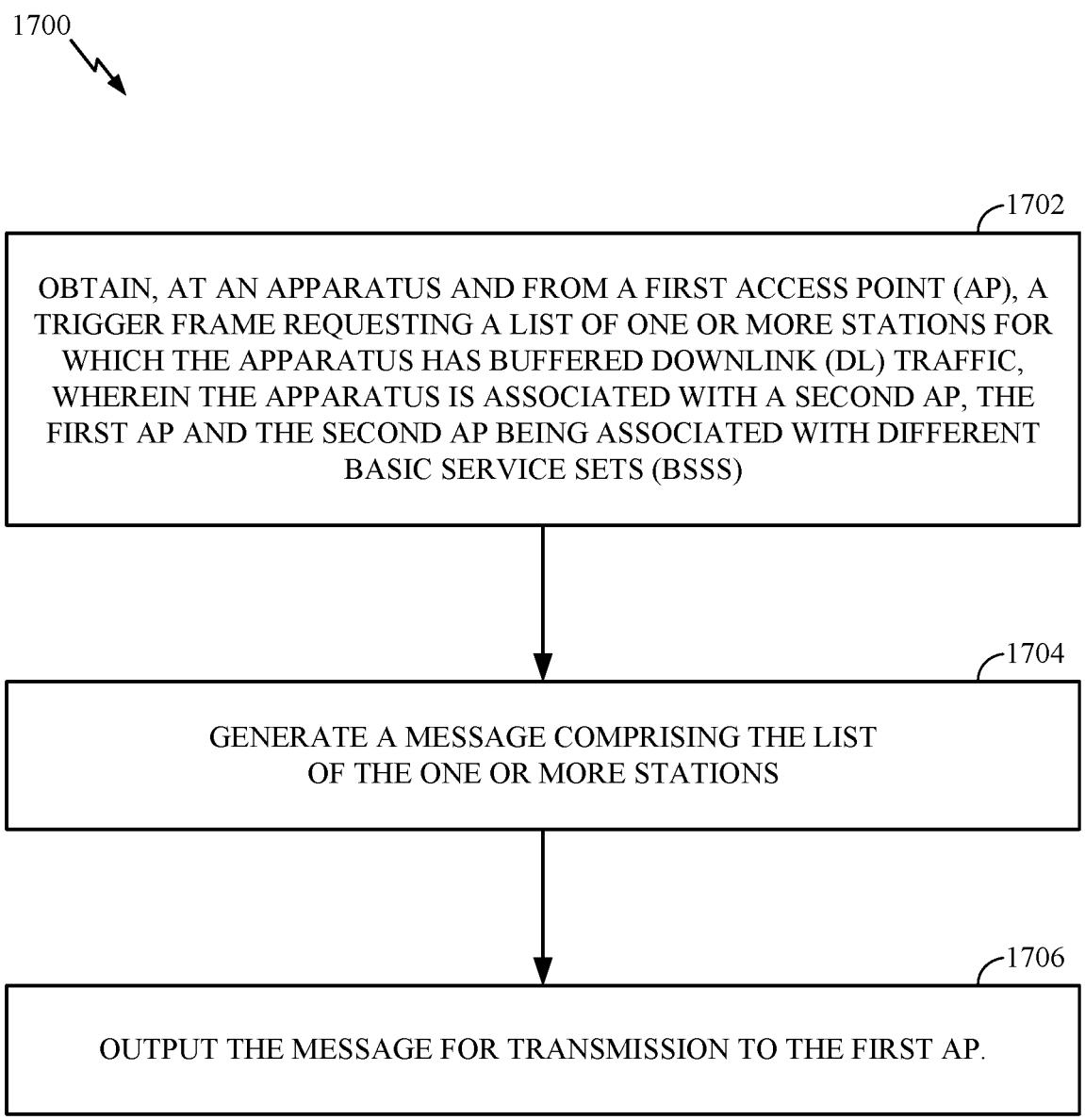
FIG. 17 is a flow diagram of example operations for wireless communication by an AP for coordinated beamforming, in accordance with certain aspects of the present disclosure.

FIG. 17 is a flow diagram of example operations 1700 for wireless communication, in accordance with certain aspects of the present disclosure. The operations 1700 may be performed by an apparatus (e.g., hosted by an AP).

Operations 1700 may be implemented as software components that are executed and run on one or more processors (e.g., controller 230 of FIG. 2). Further, the transmission and reception of signals by the AP in operations 1700 may be enabled, for example, by one or more antennas (e.g., antennas 224 of FIG. 2). In certain aspects, the transmission and/or reception of signals by the AP may be implemented via a bus interface of one or more processors (e.g., controller 230) obtaining and/or outputting signals.

The operations 1700 begin, at block 1702, by obtaining, from a first AP, a trigger frame requesting a list of one or more stations for which the apparatus has buffered DL traffic. In certain aspects, the apparatus is associated with a second AP, the first AP and the second AP being associated with different BSSs. At block 1704, the apparatus generates a message comprising the list of the one or more stations, and at block 1706, outputs the message for transmission to the first AP. In certain aspects, the trigger frame is encoded with a partial TSF and time information with higher granularity (e.g., nanoseconds) in the common info subfields corresponding to A2 and SR. The partial TSF facilitates correction of clock drift while the additional granularity helps tightly align the DL transmission for coordinated beamforming.

Figure 18:
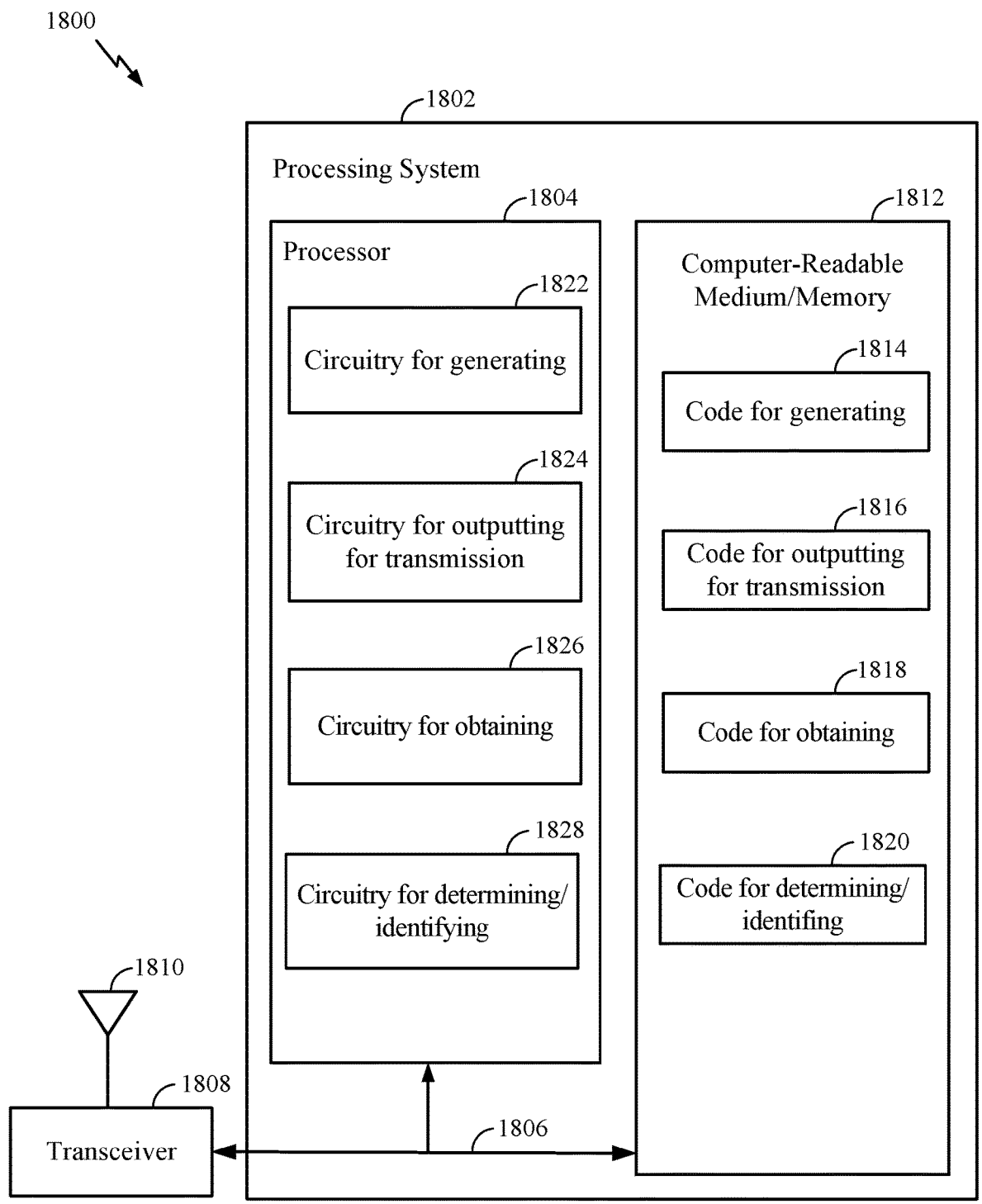
FIG. 18 illustrates a communications device that may include various components configured to perform operations for the techniques disclosed herein.

FIG. 18 illustrates a communications device 1800 that may include various components (e.g., corresponding to means-plus-function components) configured to perform operations for the techniques disclosed herein, such as the operations illustrated in FIG. 4. The communications device 1800 includes a processing system 1802 coupled to a transceiver 1808. The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform operations of the various techniques discussed herein for communication of AP coordination. In certain aspects, computer-readable medium/memory 1812 stores code 1814 for generating; code 1816 for outputting for transmission; code 1818 for obtaining; and code 1820 for determining/identifying. In certain aspects, the processor 1804 has circuitry configured to implement the code stored in the computer-readable medium/memory 1812. The processor 1804 includes circuitry 1822 for generating; circuitry 1824 for outputting for transmission; code 1826 for obtaining; and circuitry 1828 for determining/identifying.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a station 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. In certain aspects, the computer program product may include packaging material.

Further, it should be appreciated that modules and/or other appropriate means for performing the methods and techniques described herein can be downloaded and/or otherwise obtained by a station and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a station and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
a processing system configured to generate a message comprising coordination information, wherein the apparatus is associated with a first access point (AP), the message to be used for coordinated communications by the first AP and a second AP, wherein the first AP and the second AP are associated with different basic service sets (BSSs), wherein the coordination information comprises synchronization information; and
a first interface configured to output the message for transmission during a networking coordination window of a networking cluster, wherein the networking coordination window corresponds to a time period during which the first AP and the second AP contend for different resources within a set of resources for communication.

2. The apparatus of claim 1, wherein the coordination information comprises service period (SP) information.

3. The apparatus of claim 1, wherein the processing system is further configured to assign a wireless node to participate in the networking cluster to synchronize clocks of the first AP and the second AP, wherein the message is outputted for transmission to the wireless node.

4. The apparatus of claim 3, wherein the processing system is further configured to select the wireless node from a plurality of wireless nodes based on a condition of the wireless node.

5. The apparatus of claim 1, wherein the processing system is configured to align or orthogonalize at least one of downlink (DL) or uplink (UL) transmissions for the first AP and the second AP in one or more SPs in accordance with the coordination information.

6. An apparatus for wireless communication, comprising:
a processing system configured to generate a first message for polling one or more wireless nodes to gather synchronization information from a first access point (AP), the apparatus being associated with a second AP, the first AP and the second AP being associated with different basic service sets (BSSs);
a first interface configured to output the first message for transmission to the one or more wireless nodes; and
a second interface configured to obtain a second message from the one or more wireless nodes comprising the synchronization information, wherein the synchronization information comprises a timing synchronization function (TSF) and is carried within at least one signal (SIG) field associated with the second message.

7. The apparatus of claim 6, wherein the synchronization information comprises a beacon report.

8. The apparatus of claim 6, wherein:
the second interface is configured to obtain a third message from each of the one or more wireless nodes after obtaining the second message, the third message comprising a partial TSF having a fewer number of bits than the TSF.

9. The apparatus of claim 6, wherein:
the processing system is further configured to generate a third message comprising service period (SP) information for aligning or orthogonalizing at least one of downlink (DL) or uplink (UL) transmissions for the first AP and the second AP in one or more SPs; and
the first interface is configured to output the third message for transmission after obtaining the second message.

10. An apparatus for wireless communication, comprising:
a first interface configured to:
obtain, from a first access point (AP), a first message, wherein the apparatus is associated with a wireless node, the first message assigning the wireless node to participate in a networking cluster for synchronizing clocks of the first AP and a second AP, the first AP and the second AP being associated with different basic service sets (BSSs); and
obtain, from the first AP, a second message during a first networking coordination window of the networking cluster comprising coordination information to be used for coordinated communications by the first AP and the second AP, wherein the coordination information comprises synchronization information, and wherein the first networking coordination window corresponds to a time period during which the first AP and the second AP contend for different resources within a set of resources for communication;
a processing system configured to generate a third message comprising the coordination information; and
a second interface configured to output the third message for transmission.

11. The apparatus of claim 10, wherein the coordination information comprises service period (SP) information.

12. The apparatus of claim 11, wherein the SP information comprise an update to a previously scheduled SP.

13. The apparatus of claim 10, wherein the processing system is configured to generate a synchronization beacon for the synchronization of the clocks, and wherein the second interface is configured to output the synchronization beacon for transmission during the first networking coordination window.

14. The apparatus of claim 10, wherein:
the first interface is further configured to obtain a fourth message from the second AP;
the processing system is further configured to generate a fifth message comprising information in the fourth message; and
the second interface is further configured to output the fifth message for transmission to the first AP during a second networking coordination window of the networking cluster, the wireless node and the first AP being part of the same BSS.

15. The apparatus of claim 14, wherein the information in the fourth message comprises other SP information or other synchronization information.

16. The apparatus of claim 10, wherein the processing system is further configured to determine whether another wireless node will forward the coordination information, wherein the generating of the third message and the outputting of the third message are performed if the other wireless node is not forwarding the coordination information.

17. The apparatus of claim 10, wherein the coordination information comprises a timing synchronization function (TSF).

18. The apparatus of claim 10, further comprising at least one antenna, wherein the first message and the second message are obtained via the at least one antenna, wherein third message is outputted for transmission via the at least one antenna, the apparatus being configured as the wireless node.

19. An apparatus for wireless communication, comprising:
- a first interface configured to obtain, from a first access point (AP), a first message, wherein the apparatus is associated with a wireless node, the first message polling the wireless node to gather synchronization information from a second AP, the first AP and the second AP being associated with different basic service sets (BSSs), wherein the first interface is further configured to obtain, from the second AP, a second message comprising the synchronization information in response to obtaining the first message, wherein the synchronization information comprises a timing synchronization function (TSF) and is carried within at least one signal (SIG) field associated with the second message;
- a processing system configured to generate a third message comprising the synchronization information; and
- a second interface configured to output the third message for transmission to the first AP.

20. The apparatus of claim 19, wherein the synchronization information comprises a beacon report.

21. The apparatus of claim 20, wherein the beacon report comprises a target wake time (TWT) element advertised by the second AP.

22. The apparatus of claim 19, wherein:
- the first interface is configured to obtain a fourth message from the second AP after obtaining the second message, the fourth message comprising a partial TSF having a fewer number of bits than the TSF;
- the processing system is further configured to generate a fifth message comprising the partial TSF; and
- the second interface is configured to output the fifth message for transmission to the first AP.

23. The apparatus of claim 22, wherein the first interface is configured obtain a trigger frame from the first AP, and wherein the fifth message comprising a trigger based (TB) data unit generated in response to the trigger frame.

24. The apparatus of claim 23, wherein the trigger frame comprises a time stamp corresponding to a time at which TB data unit is outputted for transmission by the apparatus.

25. The apparatus of claim 23, wherein the trigger frame comprises an indication of whether one or more fields of the trigger frame has been encoded with a partial TSF.

26. The apparatus of claim 25, wherein the fifth message comprises a preamble, the preamble having the partial TSF.

27. The apparatus of claim 22, wherein the fifth message comprises one or more SIG fields, the partial TSF being part of the one or more SIG fields.

28. The apparatus of claim 27, wherein the fifth message comprises a TB physical layer convergence procedure (PLCP) protocol data unit (PPDU).

29. The apparatus of claim 22, wherein the fifth message comprises one or more spatial reuse (SR) fields for indicating SR criteria for one or more subbands, the SR fields comprising the partial TSF.

30. The apparatus of claim 19, further comprising at least one antenna, wherein the first message and the second message are obtained via the at least one antenna, wherein the third message is outputted for transmission via the at least one antenna, the apparatus being configured as the wireless node.

* * * * *